United States Patent
Bhattad et al.

(10) Patent No.: US 11,968,049 B2
(45) Date of Patent: Apr. 23, 2024

(54) DOWNLINK FEEDBACK INFORMATION SIGNALING ENHANCEMENTS

(71) Applicant: QUALCOMM Incorporated, San Diego, CA (US)

(72) Inventors: Kapil Bhattad, Bangalore (IN); Jing Sun, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/027,213

(22) Filed: Sep. 21, 2020

(65) Prior Publication Data
US 2021/0099258 A1    Apr. 1, 2021

(30) Foreign Application Priority Data
Sep. 30, 2019    (IN) .............................. 201941039482

(51) Int. Cl.
*H04L 1/1812* (2023.01)
*H04W 72/044* (2023.01)
(Continued)

(52) U.S. Cl.
CPC ....... *H04L 1/1819* (2013.01); *H04W 72/0466* (2013.01); *H04W 72/1273* (2013.01);
(Continued)

(58) Field of Classification Search
CPC ................ H04L 1/1819; H04L 1/1822; H04L 1/1854; H04L 1/1664; H04W 72/042;
(Continued)

(56) References Cited

U.S. PATENT DOCUMENTS

2019/0166621 A1    5/2019    Yerramalli et al.
2019/0261405 A1    8/2019    Ang et al.
(Continued)

FOREIGN PATENT DOCUMENTS

CN    106165510 A    11/2016

OTHER PUBLICATIONS

MediaTek Inc., Discussion on NR-U configured grant, 3GPP TSG RAN WG1 #98, Prague, Czech, Aug. 26-30, 2019, R1-1908388. (Year: 2019).*
Huawei, HiSilicon, Transmission with configured grant in NR unlicensed band, 3GPP TSG RAN WG1 #98, Prague, Czech, Aug. 26-30, 2019, R1-1908112. (Year: 2019).*
(Continued)

*Primary Examiner* — Shailendra Kumar
(74) *Attorney, Agent, or Firm* — Norton Rose Fulbright US LLP

(57) ABSTRACT

Enhancements to downlink feedback information (DFI) signaling is disclosed. According to the disclosed aspects, indications of DFI presence in downlink control information (DCI) messaging are provided that limit any increase to DCI overhead for uplink grants. In a first aspect, DFI presence may be signaled using unused or disallowed DCI variable states for indication of DFI presence. In another aspect, a separate bit may be added to a DCI message for indicating DFI presence. Additional aspects include repurposing DCI fields which are specific to cell radio network temporary identifier (C-RNTI)-based uplink grants, or may defining a new RNTI (e.g., DFI-RNTI) for indicating DFI presence. Further aspects may provide for radio resource control (RRC) signaling that configures which DCI variable state can be used to indicate DFI presence.

26 Claims, 12 Drawing Sheets

(51) Int. Cl.
*H04W 72/1273* (2023.01)
*H04W 72/23* (2023.01)
*H04W 76/11* (2018.01)
*H04W 76/27* (2018.01)

(52) U.S. Cl.
CPC ............ *H04W 72/23* (2023.01); *H04W 76/11* (2018.02); *H04W 76/27* (2018.02)

(58) Field of Classification Search
CPC ......... H04W 72/0466; H04W 72/1273; H04W 72/14; H04W 76/11; H04W 76/27; H04W 72/0406
See application file for complete search history.

(56) References Cited

U.S. PATENT DOCUMENTS

| | | | | |
|---|---|---|---|---|
| 2019/0342911 | A1* | 11/2019 | Talarico | H04L 5/0055 |
| 2021/0050947 | A1* | 2/2021 | Tsai | H04L 1/1812 |
| 2021/0344448 | A1* | 11/2021 | Nogami | H04L 5/0053 |
| 2022/0303069 | A1* | 9/2022 | Lin | H04L 1/1822 |
| 2022/0368475 | A1* | 11/2022 | Lei | H04L 1/1864 |

OTHER PUBLICATIONS

Partial International Search Report—PCT/US2020/052010—ISA/EPO—Dec. 10, 2020.

Huawei: et al., "Transmission with Configured Grant in NR Unlicensed Band", 3GPP Draft, 3GPP TSG RAN WG1 Meeting #98, R1-1908112, 3rd Generation Partnership Project (3GPP), Mobile Competence Centre, 650, Route Des Lucioles, F-06921 Sophia-Antipolis Cedex, France, vol. RAN WG1, No. Prague, Czech Republic, 20190826-20190830, Aug. 17, 2019 (Aug. 17, 2019), XP051764732, 18 Pages, Retrieved from the Internet: URL: http://www.3gpp.org/ftp/tsg_ran/WG1_RL1/TSGR1_98/Docs/R1-1908112.zip. [retrieved on Aug. 17, 2019] p. 11, last. par.

International Search Report and Written Opinion—PCT/US2020/052010—ISA/EPO—dated Feb. 8, 2021 (195468WO).

Mediatek Inc: "Discussion on NR-U configured grant", 3GPP Draft, 3GPP TSG RAN WG1 #98, R1-1908388, Discussion on NR-U configured grant MTK Final, 3rd Generation Partnership Project (3GPP), Mobile Competence Centre, 650, Route Des Lucioles, F-06921 Sophia-Antipolis Cedex, France, vol. RAN WG1, No. Prague, Czech, 20190826-20190830, Aug. 17, 2019 (Aug. 17, 2019), XP051764997, 3 Pages, Retrieved from the Internet: URL: http://www.3gpp.org/ftp/tsg_ran/WG1_RL1/TSGR1_98/Docs/R1-1908388.zip. [retrieved on Aug. 17, 2019] p. 2 section 2.2, par. blw. Observation 1.

* cited by examiner

DOWNLINK FEEDBACK INFORMATION SIGNALING ENHANCEMENTS

CROSS-REFERENCE TO RELATED APPLICATIONS

This application claims the benefit of Indian Patent Application No. 201941039482, entitled, "DFI SIGNALING ENHANCEMENTS," filed on Sep. 30, 2019, which is expressly incorporated by reference herein in its entirety.

BACKGROUND

Field

Aspects of the present disclosure relate generally to wireless communication systems, and more particularly, to downlink feedback information (DFI) signaling enhancements.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes generating, by a base station, downlink feedback information (DFI) for communications with a user equipment (UE), preparing, by the base station, a grant type downlink control information (DCI) message including the DFI, indicating, by the base station, presence of the DFI in the grant type DCI message using an available DCI variable state from a plurality of DCI variable states available for the grant type DCI message, and transmitting, by the base station, the grant type DCI with the DFI to the UE.

In an additional aspect of the disclosure, a method of wireless communication includes generating, by a base station, DFI for communications with a UE, preparing, by the base station, a grant type DCI message including the DFI, adding, by the base station, a DFI indicator to the grant type DCI message, and transmitting, by the base station, the grant type DCI with the DFI to the UE.

In an additional aspect of the disclosure, a method of wireless communication includes generating, by a base station, DFI for communications with a UE, preparing, by the base station, a grant type DCI message including the DFI, wherein the grant type DCI message with the DFI is defined by a DCI variable state configured for DFI indication, signaling, by the base station, a configuration message to the UE identifying the DCI variable state configured for the DFI indication, and transmitting, by the base station, the grant type DCI with the DFI to the UE.

In an additional aspect of the disclosure, a method of wireless communication includes receiving, at a UE, a grant type DCI message, identifying, by the UE, a DCI variable state associated with indicating presence of a DFI within in the grant type DCI message, wherein the DCI variable state is identified from a plurality of DCI variable states available for the grant type DCI message, and transmitting, by the UE, uplink transmissions configured according to the DFI.

In an additional aspect of the disclosure, a method of wireless communication includes receiving, at a UE, a grant type DCI message, identifying, by the UE, a DFI indicator within in the grant type DCI message, wherein the DFI indicator identifies presence of a DFI within the grant type DCI message, and transmitting, by the UE, uplink transmissions configured according to the DFI.

In an additional aspect of the disclosure, a method of wireless communication includes receiving, at a UE, a grant type DCI message, receiving, by the UE, a configuration message from a serving base station, wherein the configuration message identifies a DCI variable state configured for indication of DFI presence, identifying, by the UE, the DCI variable state within in the grant type DCI message, wherein the DCI variable state identifies presence of a DFI within the grant type DCI message, and transmitting, by the UE, uplink transmissions configured according to the DFI.

In an additional aspect of the disclosure, an apparatus configured for wireless communication includes means for generating, by a base station, DFI for communications with a UE, means for preparing, by the base station, a grant type DCI message including the DFI, means for indicating, by the base station, presence of the DFI in the grant type DCI message using an available DCI variable state from a plurality of DCI variable states available for the grant type DCI message, and means for transmitting, by the base station, the grant type DCI with the DFI to the UE.

In an additional aspect of the disclosure, an apparatus configured for wireless communication includes means for generating, by a base station, DFI for communications with a UE, means for preparing, by the base station, a grant type DCI message including the DFI, means for adding, by the base station, a DFI indicator to the grant type DCI message, and means for transmitting, by the base station, the grant type DCI with the DFI to the UE.

In an additional aspect of the disclosure, an apparatus configured for wireless communication includes means for generating, by a base station, DFI for communications with a UE, means for preparing, by the base station, a grant type DCI message including the DFI, wherein the grant type DCI message with the DFI is defined by a DCI variable state configured for DFI indication, means for signaling, by the base station, a configuration message to the UE identifying the DCI variable state configured for the DFI indication, and means for transmitting, by the base station, the grant type DCI with the DFI to the UE.

In an additional aspect of the disclosure, an apparatus configured for wireless communication includes means for receiving, at a UE, a grant type DCI message, means for identifying, by the UE, a DCI variable state associated with indicating presence of a DFI within in the grant type DCI message, wherein the DCI variable state is identified from a plurality of DCI variable states available for the grant type DCI message, and means for transmitting, by the UE, uplink transmissions configured according to the DFI.

In an additional aspect of the disclosure, an apparatus configured for wireless communication includes means for receiving, at a UE, a grant type DCI message, means for identifying, by the UE, a DFI indicator within in the grant type DCI message, wherein the DFI indicator identifies presence of a DFI within the grant type DCI message, and means for transmitting, by the UE, uplink transmissions configured according to the DFI.

In an additional aspect of the disclosure, an apparatus configured for wireless communication includes means for receiving, at a UE, a grant type DCI message, means for receiving, by the UE, a configuration message from a serving base station, wherein the configuration message identifies a DCI variable state configured for indication of DFI presence, means for identifying, by the UE, the DCI variable state within in the grant type DCI message, wherein the DCI variable state identifies presence of a DFI within the grant type DCI message, and means for transmitting, by the UE, uplink transmissions configured according to the DFI.

In an additional aspect of the disclosure, a non-transitory computer-readable medium having program code recorded thereon. The program code further includes code to generate, by a base station, DFI for communications with a UE, code to prepare, by the base station, a grant type DCI message including the DFI, code to indicate, by the base station, presence of the DFI in the grant type DCI message using an available DCI variable state from a plurality of DCI variable states available for the grant type DCI message, and code to transmit, by the base station, the grant type DCI with the DFI to the UE.

In an additional aspect of the disclosure, a non-transitory computer-readable medium having program code recorded thereon. The program code further includes code to generate, by a base station, DFI for communications with a UE, code to prepare, by the base station, a grant type DCI message including the DFI, code to add, by the base station, a DFI indicator to the grant type DCI message, and code to transmit, by the base station, the grant type DCI with the DFI to the UE.

In an additional aspect of the disclosure, a non-transitory computer-readable medium having program code recorded thereon. The program code further includes code to generate, by a base station, DFI for communications with a UE, code to prepare, by the base station, a grant type DCI message including the DFI, wherein the grant type DCI message with the DFI is defined by a DCI variable state configured for DFI indication, code to signal, by the base station, a configuration message to the UE identifying the DCI variable state configured for the DFI indication, and code to transmit, by the base station, the grant type DCI with the DFI to the UE.

In an additional aspect of the disclosure, a non-transitory computer-readable medium having program code recorded thereon. The program code further includes code to receive, at a UE, a grant type DCI message, code to identify, by the UE, a DCI variable state associated with indicating presence of a DFI within in the grant type DCI message, wherein the DCI variable state is identified from a plurality of DCI variable states available for the grant type DCI message, and code to transmit, by the UE, uplink transmissions configured according to the DFI.

In an additional aspect of the disclosure, a non-transitory computer-readable medium having program code recorded thereon. The program code further includes code to receive, at a UE, a grant type DCI message, code to identify, by the UE, a DFI indicator within in the grant type DCI message, wherein the DFI indicator identifies presence of a DFI within the grant type DCI message, and code to transmit, by the UE, uplink transmissions configured according to the DFI.

In an additional aspect of the disclosure, a non-transitory computer-readable medium having program code recorded thereon. The program code further includes code to receive, at a UE, a grant type DCI message, code to receive, by the UE, a configuration message from a serving base station, wherein the configuration message identifies a DCI variable state configured for indication of DFI presence, code to identify, by the UE, the DCI variable state within in the grant type DCI message, wherein the DCI variable state identifies presence of a DFI within the grant type DCI message, and code to transmit, by the UE, uplink transmissions configured according to the DFI.

In an additional aspect of the disclosure, an apparatus configured for wireless communication is disclosed. The apparatus includes at least one processor, and a memory coupled to the processor. The processor is configured to generate, by a base station, DFI for communications with a UE, to prepare, by the base station, a grant type DCI message including the DFI, to indicate, by the base station, presence of the DFI in the grant type DCI message using an available DCI variable state from a plurality of DCI variable states available for the grant type DCI message, and to transmit, by the base station, the grant type DCI with the DFI to the UE.

In an additional aspect of the disclosure, an apparatus configured for wireless communication is disclosed. The apparatus includes at least one processor, and a memory coupled to the processor. The processor is configured to generate, by a base station, DFI for communications with a UE, to prepare, by the base station, a grant type DCI message including the DFI, to add, by the base station, a DFI indicator to the grant type DCI message, and to transmit, by the base station, the grant type DCI with the DFI to the UE.

In an additional aspect of the disclosure, an apparatus configured for wireless communication is disclosed. The apparatus includes at least one processor, and a memory coupled to the processor. The processor is configured to generate, by a base station, DFI for communications with a UE, to prepare, by the base station, a grant type DCI message including the DFI, wherein the grant type DCI message with the DFI is defined by a DCI variable state configured for DFI indication, to signal, by the base station, a configuration message to the UE identifying the DCI variable state configured for the DFI indication, and to transmit, by the base station, the grant type DCI with the DFI to the UE.

In an additional aspect of the disclosure, an apparatus configured for wireless communication is disclosed. The apparatus includes at least one processor, and a memory coupled to the processor. The processor is configured to receive, at a UE, a grant type DCI message, to identify, by the UE, a DCI variable state associated with indicating presence of a DFI within in the grant type DCI message, wherein the DCI variable state is identified from a plurality of DCI variable states available for the grant type DCI message, and to transmit, by the UE, uplink transmissions configured according to the DFI.

In an additional aspect of the disclosure, an apparatus configured for wireless communication is disclosed. The apparatus includes at least one processor, and a memory coupled to the processor. The processor is configured to receive, at a UE, a grant type DCI message, to identify, by the UE, a DFI indicator within in the grant type DCI message, wherein the DFI indicator identifies presence of a DFI within the grant type DCI message, and to transmit, by the UE, uplink transmissions configured according to the DFI.

In an additional aspect of the disclosure, an apparatus configured for wireless communication is disclosed. The apparatus includes at least one processor, and a memory coupled to the processor. The processor is configured to receive, at a UE, a grant type DCI message, to receive, by the UE, a configuration message from a serving base station, wherein the configuration message identifies a DCI variable state configured for indication of DF presence, to identify, by the UE, the DCI variable state within in the grant type DCI message, wherein the DCI variable state identifies presence of a DFI within the grant type DCI message, and to transmit, by the UE, uplink transmissions configured according to the DFI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
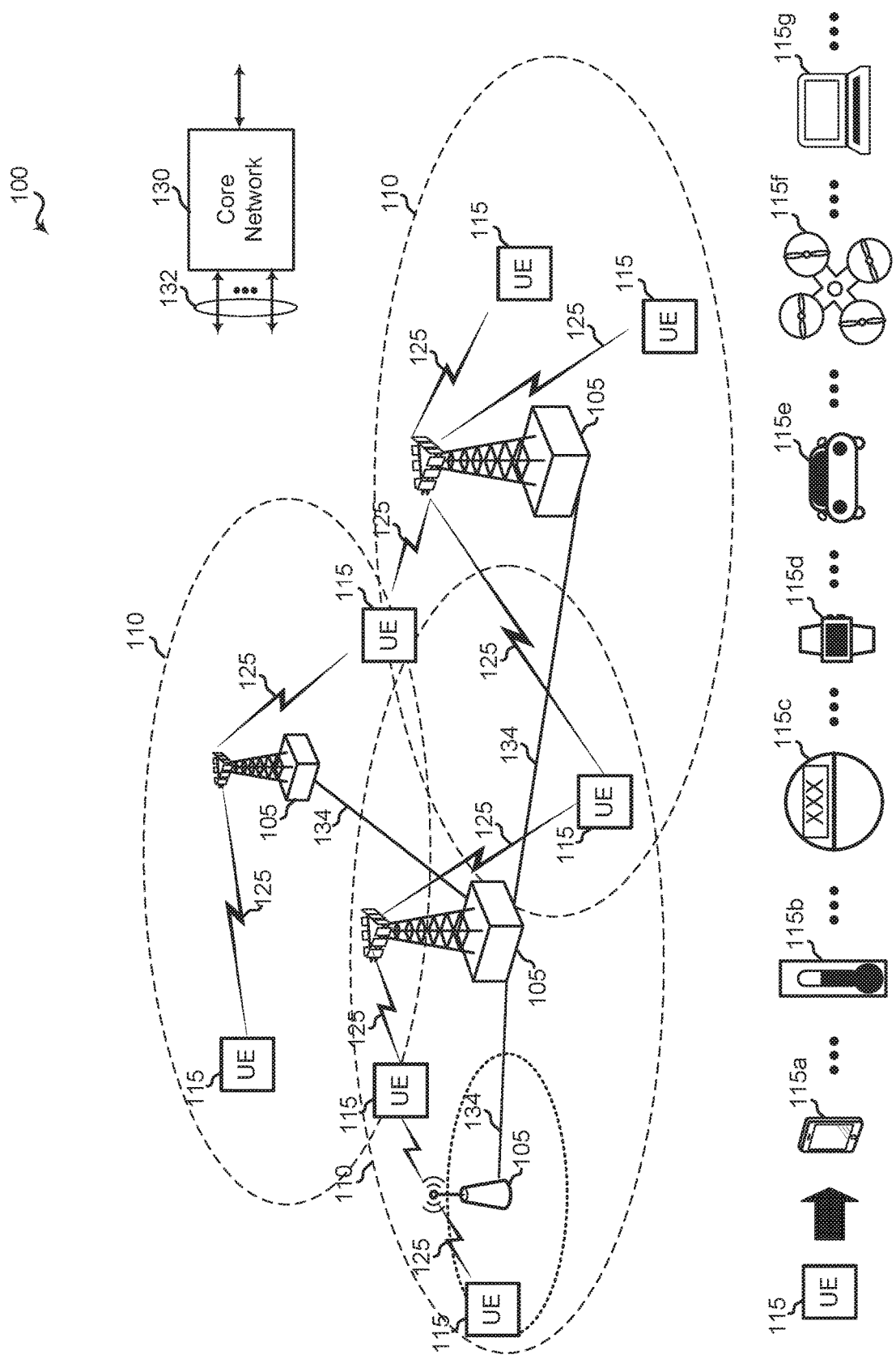
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Figure 3:
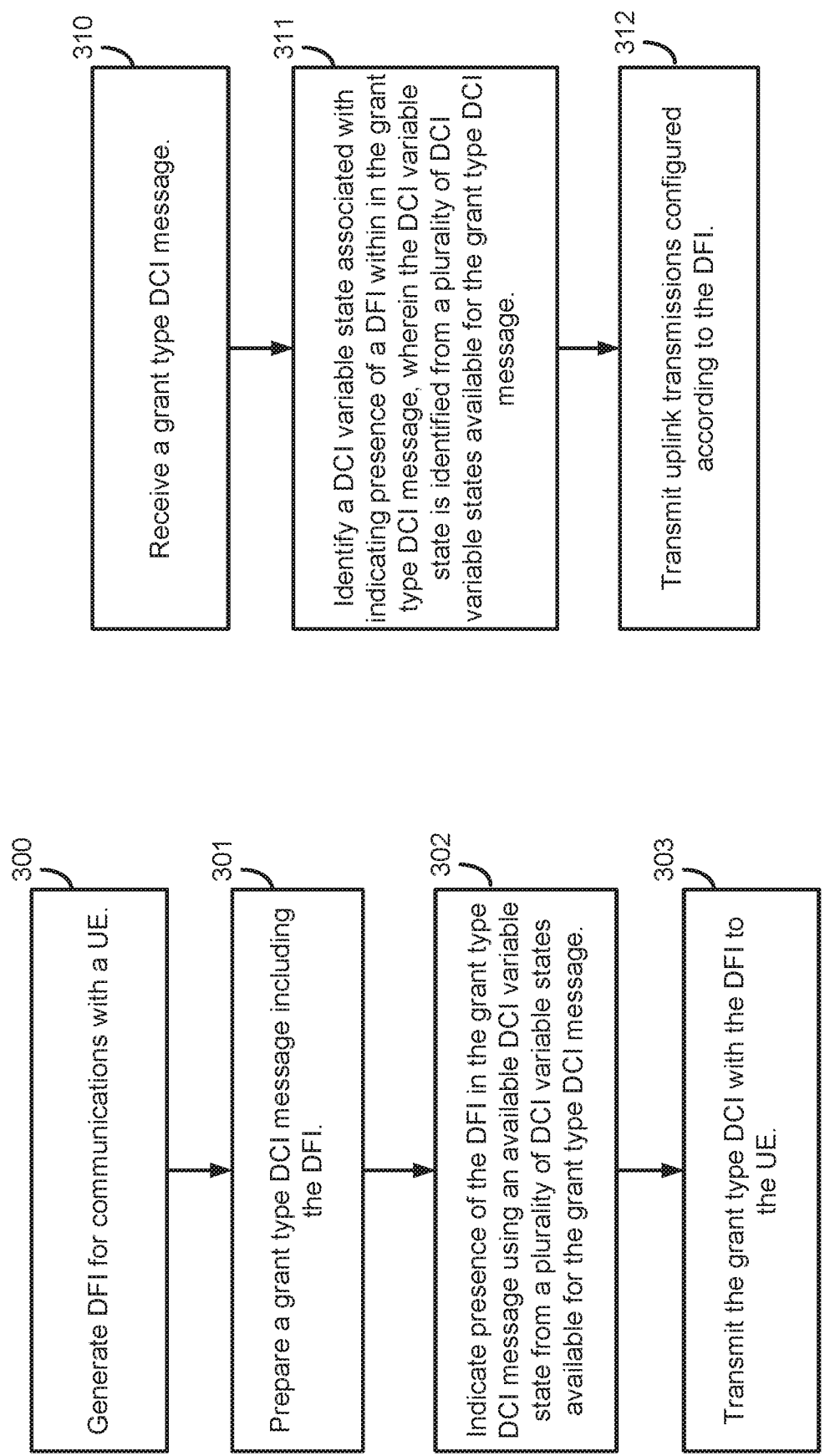
FIGS. 3A and 3B are block diagrams illustrating example blocks executed to implement aspects of the present disclosure.
Figure 4:
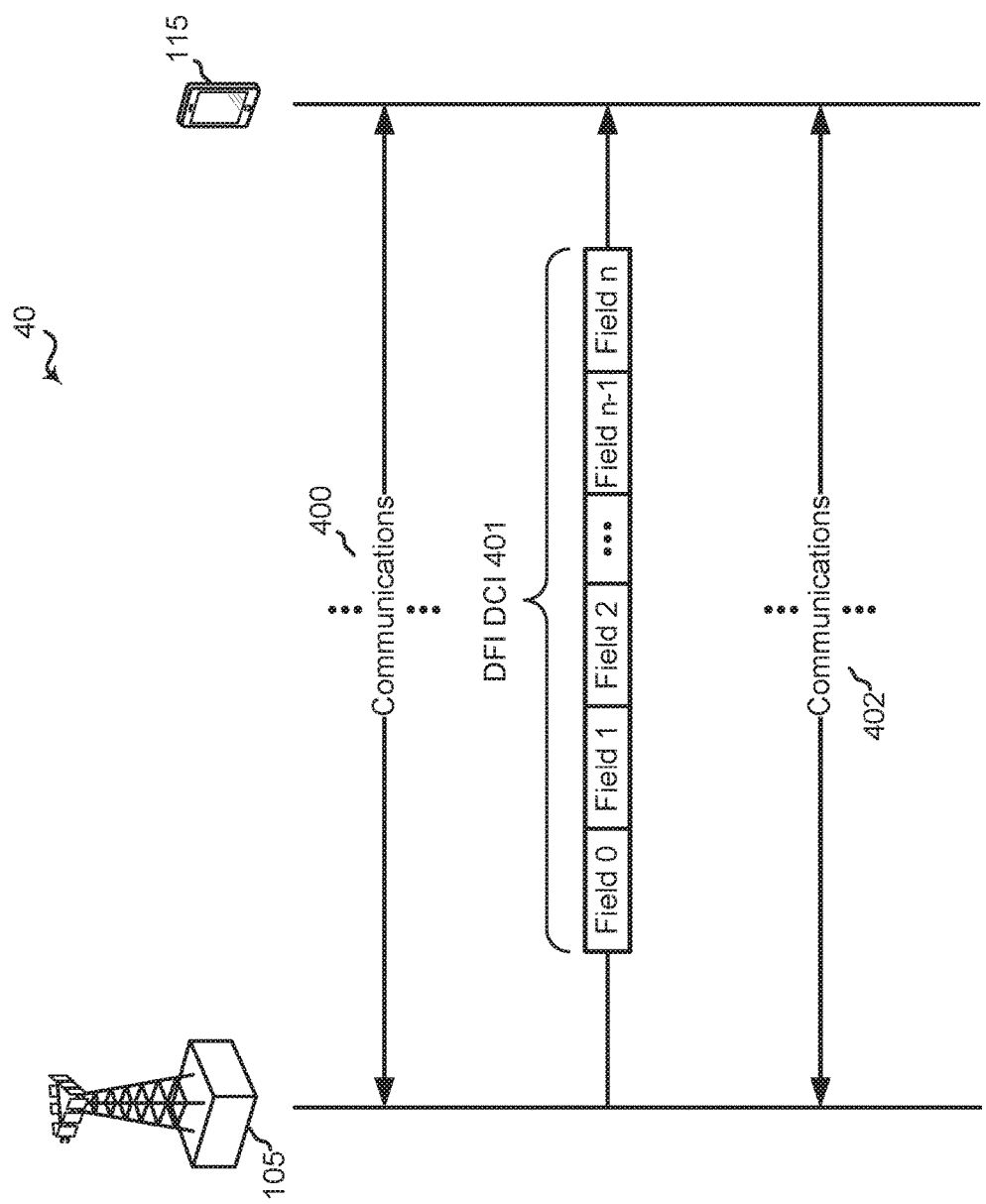
FIG. 4 is a call-flow diagram illustrating a portion of a NR-U network having a base station and UE configured according to one aspect of the present disclosure.

FIG. 1 is a block diagram illustrating an example of a wireless communications system 100 that supports the downlink feedback information (DFI) signaling enhancements according to the various aspects disclosed herein. With reference to FIGS. 3 and 4, and in accordance with aspects of the present disclosure, base station 105, under control of controller/processor 240, may execute DFI logic 301 and DFI presence signaling 302, stored in memory 242, and UE 115, under control of controller/processor 280, may execute DFI logic 401 and DFI presence signaling 402, stored in memory 282. The execution environment of such features provides base station 105 and UE 115 to implement the enhanced DFI presence signaling according to the various aspects of the present disclosure. In a first aspect, DFI presence may be signaled using unused or disallowed DCI variable states for indication of DFI presence. In another aspect, a separate bit may be added to a DCI message for indicating DFI presence. Additional aspects include repurposing DCI fields which are specific to C-RNTI-based uplink grants, or defining a new RNTI (e.g., DFI-RNTI) for indicating DFI presence. Further aspects may provide for RRC signaling that configures which DCI variable state can be used to indicate DFI presence.

The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115*a*), a personal digital assistant (PDA), a wearable device (UE 115*d*), a tablet computer, a laptop computer (UE 115*g*), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115*e* and UE 115*f*), meters (UE 115*b* and UE 115*c*), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (M1 Hz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the milli-meter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
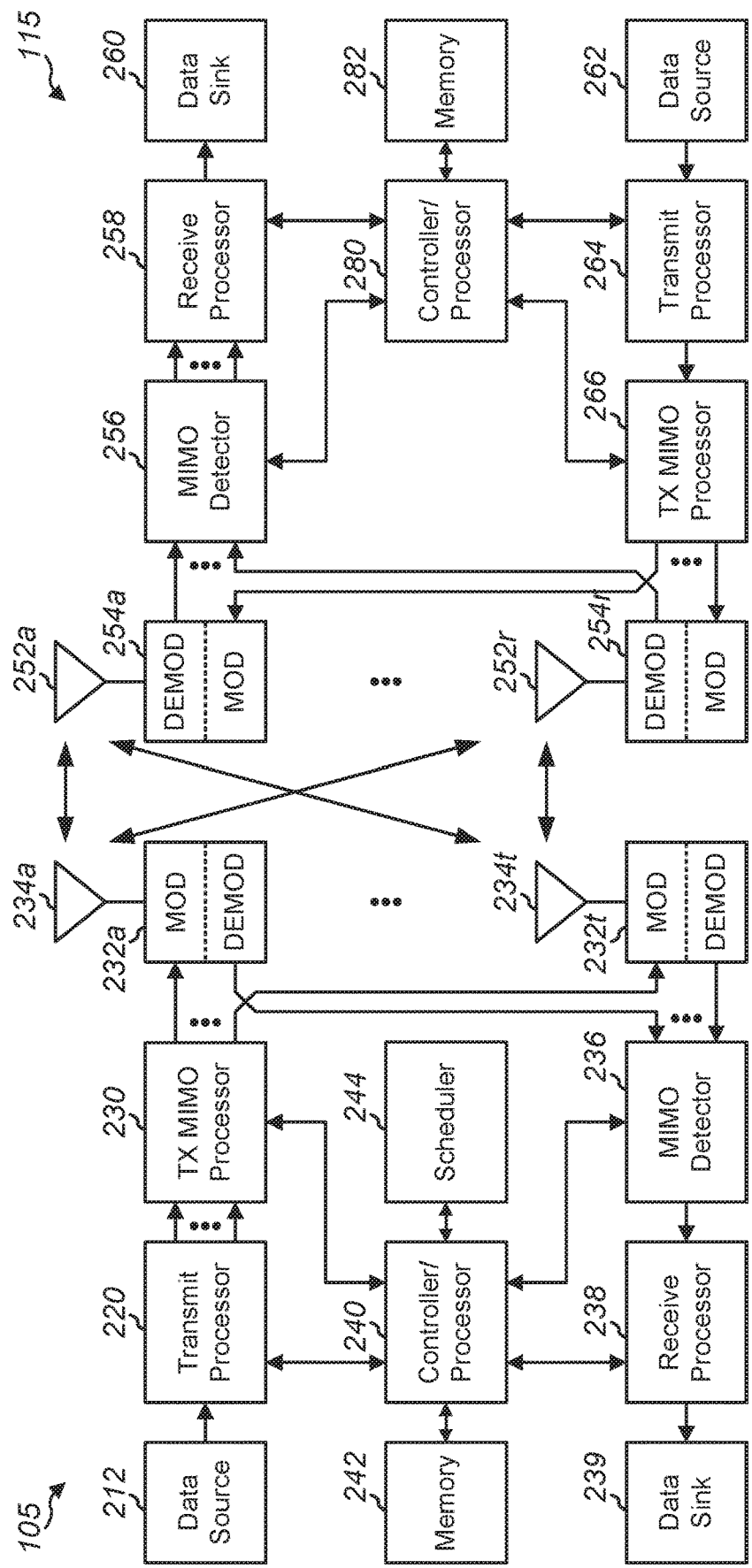
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 3A, 3B, 5A, 5B, 8A, and 8B, and/or other processes for the techniques described herein. The memories 242 and 282 may store data and program codes for the base station 105 and the UE 115, respectively. A scheduler 244 may schedule UEs for data transmission on the downlink and/or uplink.

NR-U standards have provided for a downlink feedback information (DFI) message which includes a context to configured grant (CG) resources. Each CG resource may include periodic uplink resources and may also be associated with a set of hybrid automatic repeat request (HARQ) process identities. CG resources may be activated or deactivated using radio resource control (RRC) signaling or via actual activation/deactivation messages using a configured scheduling radio network temporary identifier (CS-RNTI)-based downlink control information (DCI) message. CS-RNTI may also be used for activation/deactivation of downlink semi-persistent scheduling (SPS) (such as, periodic downlink resources). The DFI may indicate acknowledgement (ACK) or negative ACK (NACK) status for HARQ processes used for CG transmissions, so that CG retransmissions can be controlled. The DFI can also indicate ACK/NACK status of other HARQ process not associated with CG resources, which can be used for contention window updates for CAT 4 LBT procedures. The DFI payload may be transmitted using a downlink control information (DCI) message.

Discussions are on-going as to how presence of the DFI may be signaled in NR-U deployments. If presence of the DFI is indicated within one of the existing DCI variable states, blind decoding efforts by UEs may be reduced. For example, in license-assisted access (LAA) operations, the autonomous uplink (AUL) standards provide for a 1 bit field (within a DCI scheduling uplink or downlink) repurposed to indicate presence of the DFI. This bit was already present in uplink grants (e.g., cell RNTI (C-RNTI)- and AUL-RNTI-based grants). This particular bit differentiates between uplink and downlink for C-RNTI-based grants. However, for AUL-RNTI-based grants, the bit was unused because AUL is limited to the uplink direction. Thus, the bit may be repurposed for indicating DFI presence for AUL. In contrast, for NR operations, because CS-RNTI may be used for scheduling both downlink SPS and uplink CG, this bit should not also be used for DFI indication. There have been suggestions to add an independent bit within a grant to specifically indicate DFI presence. However, if such a bit were added, it would be added for all grant type DCIs, which will waste considerable bit space within the DCI message. Various aspects of the present disclosure are directed to indicating the presence of DFI messaging without increasing DCI overhead for uplink or downlink grants.

Both CG and SPS resources may be activated/deactivated using a DCI if the cyclic redundancy check (CRC) of a corresponding DCI format is scrambled with a CS-RNTI, while the new data indicator (NDI) field is set to '0'. A UE may validate the DCI format for activation or deactivation if all fields for the DCI format are set according to Table 1 or Table 2, respectively. If validation is achieved, the UE considers the information in the DCI format a valid activation or valid release/deactivation of the CG/SPS resources. If the UE cannot successfully validate the DCI, the UE may consider the DCI format as having been detected without a matching CRC.

TABLE 1

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 2

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Figure 11:
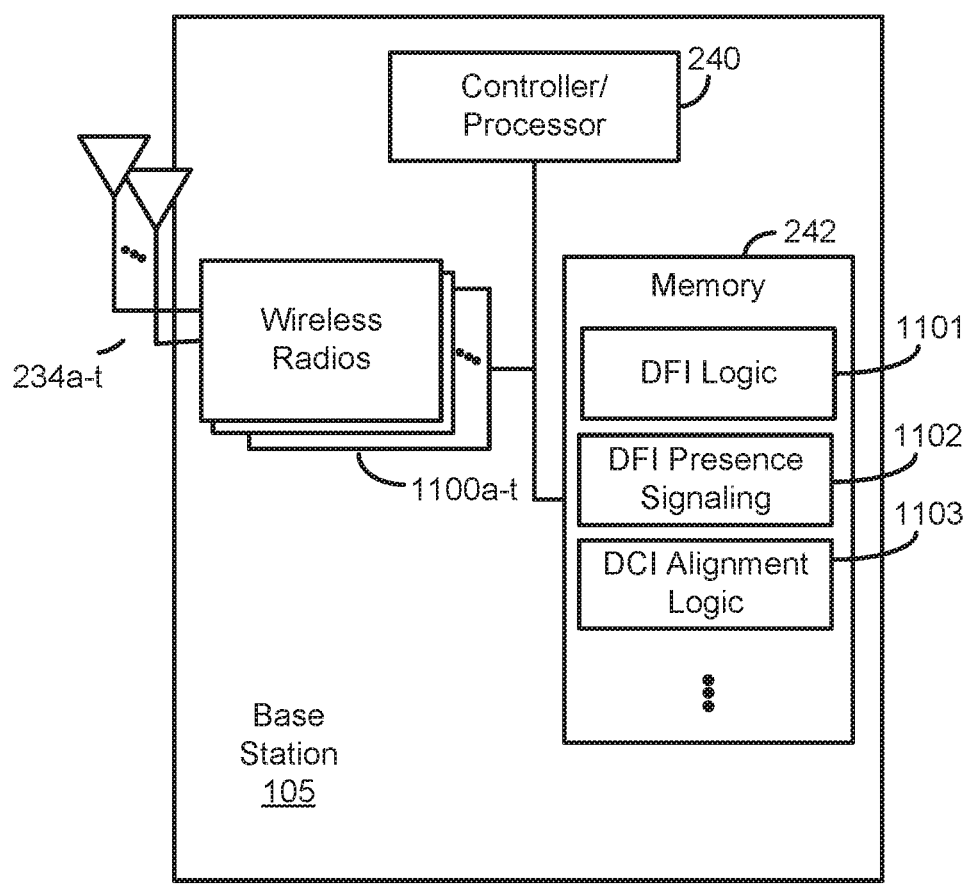
FIG. 11 is a block diagram illustrating an example base station 105 configured according to aspects of the present disclosure.

FIG. 3A is a block diagram illustrating example aspects executed to implement one aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1100*a-t* and antennas 234*a-t*. Wireless radios 1100*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 300, a base station generates DFI for communications with a UE. A DFI may indicate the ACK/NACK status for both HARQ processes used for CG transmissions and HARQ processes used for non-CG transmissions. Therefore, the base station, such as base station 105, may receive uplink transmissions from a UE, via antennas 234*a-t* and wireless radios 1100*a-t*, and determine the ACK/NACK status for such transmissions. Under control of controller/processor 240, base station 105 executes DFI logic 1101, stored in memory 242. The execution environment of DFI logic 1101 provides base station 105 the functionality for handling DFI operations. Within the execution environment of DFI logic 1101, base station 105 assembles the DFI message for the UE using the ACK/NACK status.

At block 301, the base station prepares a grant type DCI message including the DFI. Within the execution environment of DFI logic 1101, base station 105 uses a DCI message to carry the DFI. Base station 105 elects to include the DFI in a grant type DCI, according to a DCI format available for uplink or downlink grants. In preparing the grant type DCI, base station 105, under control of controller/processor 240, may execute DCI alignment logic 1103. The execution environment of DCI alignment logic may ensure that the final DCI size of the grant type DCI with the DFI payload does not exceed the expected DCI size of the grant type DCI. Alignment may include adding zero padding when the DFI payload is small creating a DCI size smaller than the expected grant type DCI size. In alternative scenarios where the DFI payload size causes the DCI size of the grant type DCI to exceed the expected DCI size of the grant type DCI, alignment may include truncation of bits from the DCI or the DFI payload.

At block 302, the base station indicates presence of the DFI in the grant type DCI message using an available DCI variable state from a plurality of DCI variable states available for the grant type DCI message. In order to signal the UE that the grant type DCI includes the DFI, base station 105 may add indication that the DFI is present. Under control of controller/processor 240, base station 105 executes DFI presence signaling logic 1102. The execution environment of DFI presence signaling logic 1102 provide the functionality to base station 105 for adding the indication to the grant type DCI that will allow the UE to know that the DFI is present in the grant type DCI. In accordance with the describe example aspect, base station 105 identifies a DCI variable state that may be unused, disallowed, or repurposed from another set DCI state to identify DFI presence in the grant type DCI.

At block 303, the base station transmits the grant type DCI with the DFI to the UE. Once base station 105 has generated the grant type DCI message that includes the DFI payload and the DCI variable state identifying the presence of the DFI, it may transmit the grant type DCI to the UE via wireless radios 1100*a-t* and antennas 234*a-t*.

Figure 12:
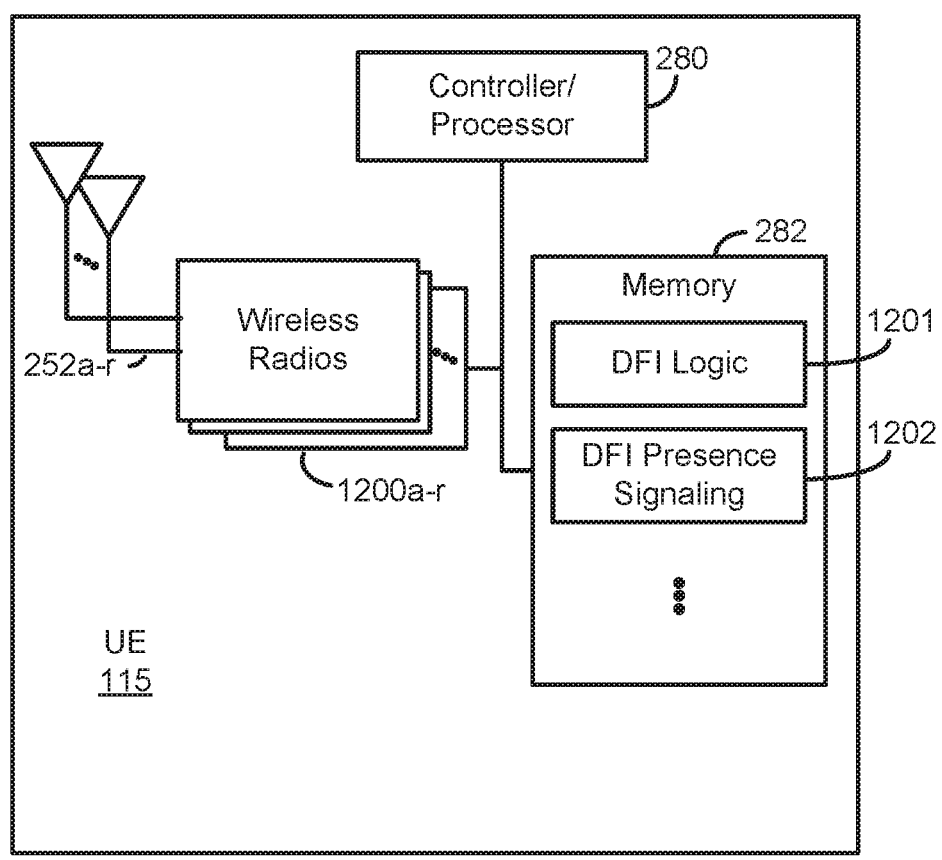
FIG. 12 is a block diagram illustrating an example UE 115 configured according to aspects of the present disclosure.

FIG. 3B is a block diagram illustrating example aspects executed to implement one aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200*a-r* and antennas 252*a-r*. Wireless radios 1200*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 310, a UE receives a grant type DCI message. A UE, such as UE 115, receives the grant type DCI message via antennas 252*a-r* and wireless radios 1200*a-r*. UE 115 may decode the signals received to reveal the grant type DCI message.

At block 311, the UE identifies a DCI variable state associated with indicating presence of a DFI within in the grant type DCI message, wherein the DCI variable state is identified from a plurality of DCI variable states available for the grant type DCI message. Under control of controller/processor 280, UE 115 executes DFI logic 1201 and DFI presence signaling logic 1202, stored in memory 282. The execution environment of DFI logic 1201 and DFI presence signaling logic 1202 provides UE 115 the functionality to conduct operations using the DFI. UE 115 knows to look for an indication within the grant type DCI that may indicate whether the DCI simply includes a grant (uplink or downlink) or includes a DFI related to prior uplink transmissions (CG transmissions or otherwise) transmitted by UE 115. Within the execution environment of DFI logic 1201 and DFI presence signaling logic 1202, UE 115 reviews the grant type DCI and recognizes the DCI variable state that indicates presence of the DFI. According to the described example aspect, the DCI variable state may represent an unused, disallowed, or repurposed variable state that UE 115 will know is not signaling a valid grant or an activation/deactivation command.

At block 312, the UE transmits uplink transmissions configured according to the DFI. After identifying the DFI, UE 115 may use the ACK/NACK information to configure or adjust future uplink transmissions. As such, UE 115 uses the identified DFI and adjusts the uplink transmissions transmitted via wireless radios 1200*a-r* and antennas 252*a-r*.

FIG. 4 is a call-flow diagram illustrating a portion of NR-U network 40 having base station 105 and UE 115 configured according to one aspect of the present disclosure. Base station 105 and UE 115 conduct communications 400, in which base station 105 may transmit messages and signaling to UE 115 and UE 115 may transmit messages and signaling to base station 105. Configured grant (CG) resources may be configured for UE 115 to perform uplink transmissions without an explicit uplink grant from base station 105. The various aspects of the present disclosure may apply when CG resources are configured and/or activated or when there are no CG resources configured. In response to some signaling from UE 115 within communications 400, base station 105 may generate DFI reflecting ACK/NACK information for CG or non-CG related HARQ processes, as the case may be. Base station 105 may include the DFI within DFI DCI 401. UE 115, upon receipt of DFI DCI 401 may obtain the ACK/NACK information from the DFI and configure relevant uplink transmissions of communications 402 further between UE 115 and base station 105.

It should be noted that formatting of DCI is controlled by the DCI format selected for the DCI and the collection of variables in the relevant fields reserved for the DCI according to the DCI format. Each DCI format may have different designated fields and numbers of fields and may have a distinct size that may be different than the DCI size of a different DCI format. As referenced above, with respect to Tables 1 and 2, the values or uses of any individual DCI field in combination for a given DCI of a given DCI type may signify something to the UE. The collection of available fields and the values presented in those fields is referred to as the DCI variable state. For example, a DCI variable state represented by the DCI field values reflected in Table 1 signifies activation of CG operations for the UE, while the DCI variable state represented by the DCI field values reflected in Table 2 signifies deactivation of the CG operations for the UE.

According to the illustrated aspect, an unused or disallowed DCI variable state may be repurposed for indicating the presence of DFI messaging. DFI DCI 401 includes fields 0-n. Fields 0-n may include fields designated for a new data indicator (NDI), a HARQ process ID (HARQ ID), a redundancy version (RV), an modulation and coding scheme (MCS), and the like, depending on the DCI format. In one example implementation, when DFI DCI 401 is a CS-RNTI-based DCI message, DFI presence may be indicated using an NDI field set to '0.' In such example implementation, the repurposed variable states should ensure that there are no conflicts with the DCI variable states that represent activation/deactivation cases. Specific examples for variable states that may not conflict with the activation/deactivation states for NDI=0 include use of one of the un-utilized HARQ IDs (e.g., HARQ ID >0); use of different values of RV (e.g., non-zero values); or use of the least significant bit (LSB) of one of the RV values or a HARQ ID set to '1,' which allows all bits apart from the NDI, the indicator of DCI format, and this LSB bit to be used for DFI payload. More generally, any one bit of the HARQ ID or RV field may be set to '1' while rest of the bits of the field can be used for DFI payload. For the preceding set of examples, if another DCI field is used to indicate DFI presence, the HARQ ID and RV fields may not be used to send DFI payload, as such locations could conflict with the DCI variable states designated for activation/deactivation commands. In such case, UE 115 may receive DFI DCI 401 and believe it represents an activation/deactivation command instead of an indication of DFI presence.

In an additional example DCI variable state, one of the predefined special MCS values can be used for indicating DFI presence. A special MCS is a set of MCS values which does not indicate transport block size and are used mainly for scheduling retransmissions. According to the example aspect, such a special MCS may be repurposed in DFI DCI 401 for indicating DFI presence.

It should be noted that an NDI set to '0' within a CS-RNTI-based DCI message may be used for activation/deactivation, while the NDI set to '1' may be used for scheduling retransmissions. Further, activation DCIs may use non-special MCS values, while the deactivation DCIs may use an all-zero MCS value, thus, the remaining MCS values can be used in the MCS field of DFI DCI 401 for indication of DFI presence.

In an additional example aspect, when DFI DCI 401 is a CS-RNTI-based DCI messages, DFI presence may be indicated with the DCI variable state using an NDI field set to '1.' In such example implementations, the specifically repurposed variable state may ensure that the DFI indication does not map to a valid retransmission grant (uplink or downlink retransmission grant). Specific examples for DCI variable states that may not conflict with the retransmission grant states for NDI=1 include use of a HARQ ID that is not assigned to CG operations; use of an invalid resource assignment value; within a DCI format 0_1, use of an uplink shared (UL-SCH) indicator set to '0' and a CSI request field set to all-0 s. Additionally, the DCI variable state for identifying DFI presence may map to a valid grant, but the grant combination mapped to may be specifically disallowed. A further DCI variable state for indicating DFI presence may include configuration of the codeblock group (CBG) transmission information to an all-0 sequence (which is not valid for a grant), or use of one of the non-special MCS values. Repurposing use of one of the non-special MCS values for indicating DFI presence may be available, as valid CS-RNTI-based retransmission grants would typically use a special MCS value.

Based on the DCI variable state selected by base station 105 to indicate DFI present, among the remaining fields of DFI DCI 401, certain fields remain unused while other fields can be repurposed to send DFI payload. For example one or more of HARQ ID field, the NDI field, RV field, MCS field, resource allocation (RA) field, or the like, may not be used for DFI payload depending on both the solution being proposed and the order in which the DFI, activation, deactivation commands are detected. For example, if DFI is indicated using a DCI variable state including NDI=0 and HARQ_ID=1, all other fields in DFI DCI 401 can be used to send DFI payload. In a second example, if DFI is indicated using a DCI variable state including NDI=0, HARQ_ID mod 2=1 (checking the least significant bit (LSB) of HARQ bit), then all other fields and remaining bits of HARQ ID field in DFI DCI 401 can be used to send DFI payload. In a third example, if the DFI is indicated using a DCI variable state including NDI=0, HARQ ID=0, MCS=some specific MCS, then base station 105 cannot use the RV field of DFI DCI 401 for DFI payload as it could conflict with valid activation/deactivation commands (e.g., RV=0 is used for activation/deactivation).

The illustrated aspects of FIG. 4, in which base station 105 may select a DCI variable state that uses select available fields of fields 1-n to indicate DFI presence, can also be extended to DFI DCI 401 being a C-RNTI-based DCI. For example, the configuration of available fields selected for the DCI variable state by base station 105 may map to an invalid grant, such as using an invalid value of the bandwidth part (BWP) indicator or carrier indicator. In such example aspect, if UE 115 were configured with 3 BWPs, then the BWP indicator indicating all 1 s can be used by base station 105 to indicate DFI presence. When UE 115 would decode the BWP indicator of all 1s, it would assume the DFI was present in DFI DCI 401. However, note that if UE 115 is configured for 4 BWPs, then base station 105 may not indicate the presence of DFI in this manner.

In a second example aspect, where the channel access priority class (CAPC) and LBT category are not jointly coded, then base station 105 may select a DCI variable state that includes an invalid combination of CAPC and LBT category to indicate DFI presence. For example, base station 105 may select a DCI variable state that includes a non-zero CAPC with a CAT 2 LBT or no-LBT to indicate DFI presence. In a third example, base station may select a DCI variable state that includes an invalid value of the resource assignment field (time or frequency). In such example aspect, base station 105 may use a frequency allocation field that points to resources outside of the configured BWP to indicate DFI presence. Note that here as well if the value of the selected combination of fields 1-n for the DCI variable state is valid, then base station 105 cannot use such a combination to indicate DFI presence. In a further example aspect, base station 105 may use a DCI format 0_1 and select a DCI variable state including the UL-SCH indicator of "0" and the CSI request field of all 0 s to indicate DFI presence.

In another alternative aspect, base station 105 may provide for use of a DCI variable state which is valid but which may be specifically reserved for indicating DFI presence. For example, the frequency allocation field of all 1s can be reserved for indicating presence of DFI. However, reserving such a field value for DFI presence indication invalidates the use of the otherwise valid field (e.g., the all-1 frequency allocation field) for an uplink grant.

As indicated above, each DCI format may have a different set of parameter fields and may be of a different overall length than other DCI formats. In certain implementations, a particular combination of fields selected for the DCI variable state may apply across multiple DCI formats. Conversely, a particular combination of fields selected for the DCI variable state of one DCI format may not apply in a different DCI format. In such scenario, base station 105 may select a different combination of parameter fields for the DCI variable state to indicate DFI presence depending on the DCI format indicated for DFI DCI 401. While some of the above examples indicate application to uplink DCI formats, the various aspects of the present disclosure may be used equally with downlink DCI formats (e.g., Format 1_0 or 1_1). In such alternative implementations, base station 105 would select the combination of parameter fields for the DCI variable state to indicate DFI presence that avoid conflicting with downlink SPS activation/deactivation/retransmission commands.

In an alternative aspect of the present disclosure illustrated in FIG. 4, the available field, of fields 1-n of DFI DCI 401 selected by base station 105 for the DCI variable state to indicate DFI presence may be repurposed DCI fields which are specific to C-RNTI-based grant type DCIs (uplink or downlink grants). It should be noted that C-RNTI-based grant type DCIs for NR-U may have fields/parameters which are not applicable to CS-RNTI-based grant type DCIs. In such circumstances, base station 105 may select to use one of such C-RNTI fields to indicate presence of DFI using a CS-RNTI-based grant type DCI. One example of such unsupported fields between C-RNTI and CS-RNTI-based grant type DCIs is the multi-TTI grant field, which represents a single DCI scheduling multiple uplink grants. This multi-TTI grant field is not applicable to CS-RNTI. Thus, base station 105 may select a DCI variable state that includes any parameter which is specific to the multi-TTI grant field to indicate DFI presence.

Figure 5:
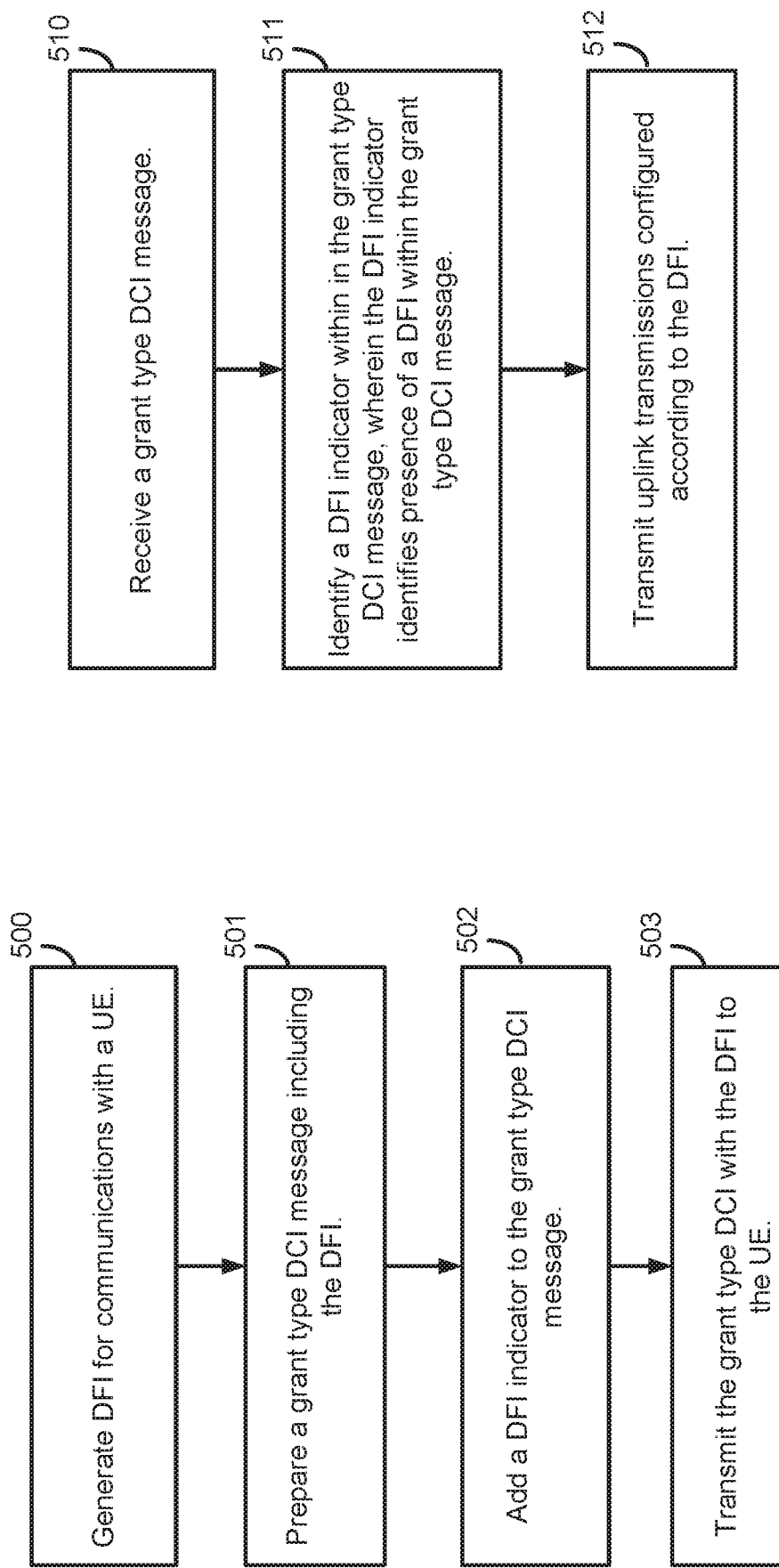
FIGS. 5A and 5B are block diagrams illustrating example blocks executed to implement aspects of the present disclosure.

FIG. 5A is a block diagram illustrating example aspects executed to implement one aspect of the present disclosure. The example blocks will also be described with respect to base station 105 as illustrated in FIG. 11.

At block 500, a base station generates DFI for communications with a UE. A base station, such as base station 105, may receive uplink transmissions from a UE, via antennas 234a-t and wireless radios 1100a-t, and determine the ACK/NACK status for such transmissions. Under control of controller/processor 240, base station 105 executes DFI logic 1101, stored in memory 242. The execution environment of DFI logic 1101 provides base station 105 the functionality for handling DFI operations. Within the execution environment of DFI logic 1101, base station 105 assembles the DFI message for the UE using the ACK/NACK status.

At block 501, the base station prepares a grant type DCI message including the DFI. Within the execution environment of DFI logic 1101, base station 105 uses a DCI message to carry the DFI. Base station 105 elects to include the DFI in a grant type DCI, according to a DCI format available for uplink or downlink grants. In preparing the grant type DCI, base station 105, under control of controller/processor 240, may execute DCI alignment logic 1103. The execution environment of DCI alignment logic may ensure that the final DCI size of the grant type DCI with the DFI payload does not exceed the expected DCI size of the grant type DCI. Alignment may include adding zero padding when the DFI payload is small creating a DCI size smaller than the expected grant type DCI size. In alternative scenarios where the DFI payload size causes the DCI size of the grant type DCI to exceed the expected DCI size of the grant type DCI, alignment may include truncation of bits from the DCI or the DFI payload.

At block 502, the base station adds a DFI indicator to the grant type DCI message. In order to signal the UE that the grant type DCI includes the DFI, base station 105 may add a DFI indicator that reveals the presence of the DFI in the grant type DCI. Under control of controller/processor 240, base station 105 executes DFI presence signaling logic 1102. The execution environment of DFI presence signaling logic 1102 provide the functionality to base station 105 for adding the DFI indication to the grant type DCI that will allow the UE to know that the DFI is present in the grant type DCI. In accordance with the describe example aspect, base station 105 may identify a DFI bit included within the DCI or a DFI-RNTI that scrambles the grant type DCI. The UE may then recognize either the DFI bit or that the grant type DCI is DFI-RNTI-based and assume that the DFI is present in the grant type DCI.

At block 503, the base station transmits the grant type DCI with the DFI to the UE. Once base station 105 has generated the grant type DCI message that includes the DFI payload and the DCI variable state identifying the presence of the DFI, it may transmit the grant type DCI to the UE via wireless radios 1100a-t and antennas 234a-t.

FIG. 5B is a block diagram illustrating example aspects executed to implement one aspect of the present disclosure. The example blocks will also be described with respect to UE 115 as illustrated in FIG. 12.

At block 510, a UE receives a grant type DCI message. A UE, such as UE 115, receives the grant type DCI message via antennas 252a-r and wireless radios 1200a-r. UE 115 may decode the signals received to reveal the grant type DCI message.

At block 511, the UE identifies a DFI indicator within in the grant type DCI message, wherein the DFI indicator identifies presence of a DFI within the grant type DCI message. Under control of controller/processor 280, UE 115 executes DFI logic 1201 and DFI presence signaling logic 1202, stored in memory 282. The execution environment of DFI logic 1201 and DFI presence signaling logic 1202 provides UE 115 the functionality to conduct operations using the DFI. UE 115 knows to look for an indication within the grant type DCI that may indicate whether the DCI simply includes a grant (uplink or downlink) or includes a DFI related to prior uplink transmissions (CG transmissions or otherwise) transmitted by UE 115. Within the execution environment of DFI logic 1201 and DFI presence signaling logic 1202, UE 115 reviews the grant type DCI and recognizes the DCI indicator that identifies the presence of the DFI. In accordance with the describe example aspect, UE 115 may recognize either a DFI bit or that the grant type DCI is scrambled with a DFI-RNTI and assume that the DFI is present in the grant type DCI.

At block 512, the UE transmits uplink transmissions configured according to the DFI. After identifying the DFI, UE 115 may use the ACK/NACK information to configure or adjust future uplink transmissions. As such, UE 115 uses the identified DFI and adjusts the uplink transmissions transmitted via wireless radios 1200a-r and antennas 252a-r.

Figure 6:
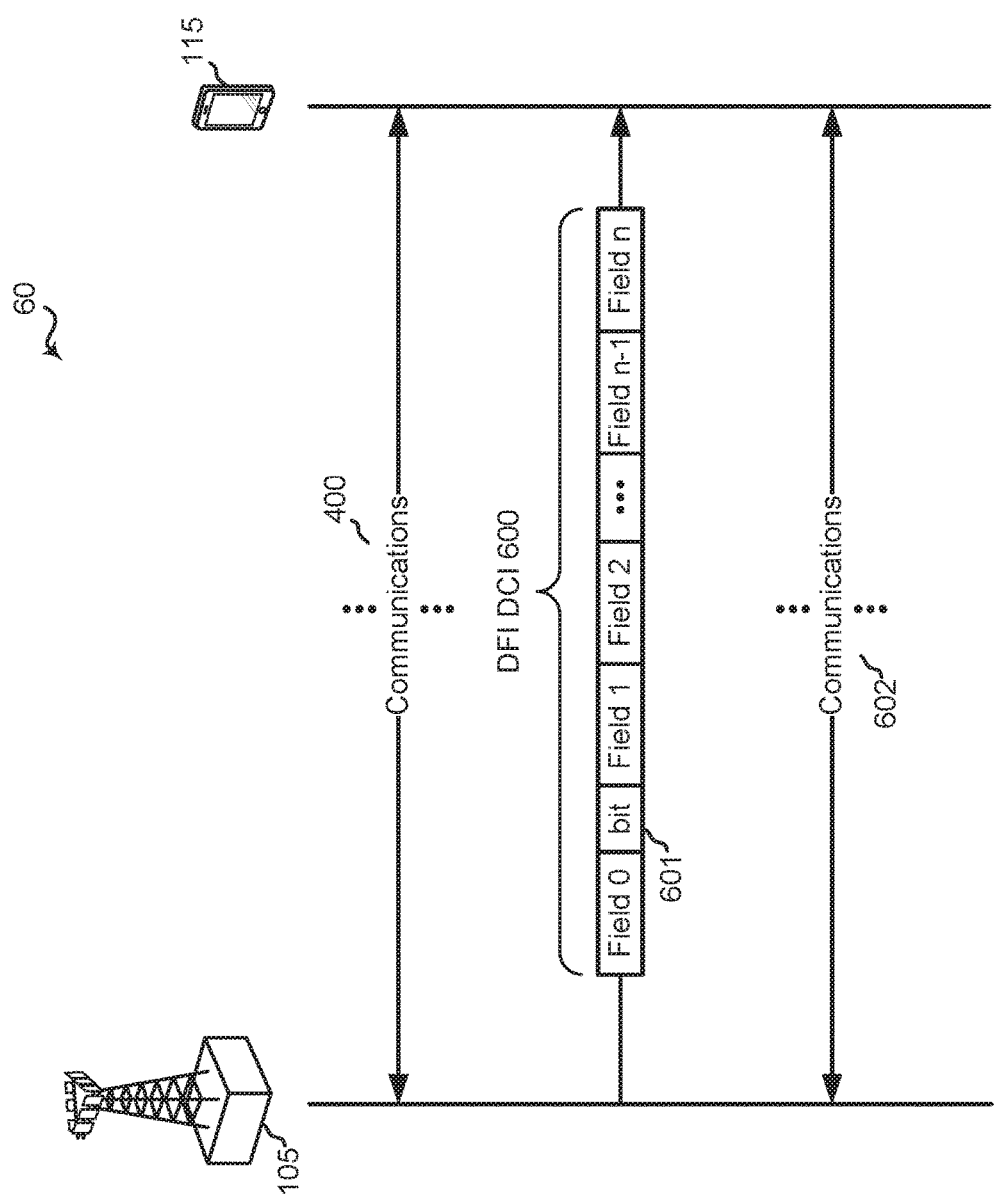
FIG. 6 is a call-flow diagram illustrating a portion of a NR-U network having a base station and UE configured according to one aspect of the present disclosure.

FIG. 6 is a call-flow diagram illustrating a portion of NR-U network 60 having base station 105 and UE 115 configured according to one aspect of the present disclosure. Base station 105 and UE 115 conduct communications 400, in which base station 105 may transmit messages and signaling to UE 115 and UE 115 may transmit messages and signaling to base station 105. As indicated previously, in response to some signaling from UE 115 within communications 400, base station 105 may generate DFI reflecting ACK/NACK information for CG or non-CG related HARQ processes, as the case may be. Base station 105 includes the DFI within DFI DCI 600. UE 115, upon receipt of DFI DCI 600, may obtain the ACK/NACK information from the DFI and configure relevant uplink transmissions of communications 602 further between UE 115 and base station 105.

According to the illustrated aspect, a separate bit, bit 601, may be added within DFI DCI 600 for indicating DFI presence. Bit 601 will explicitly inform whether the DFI is included in DFI DCI 600. In such additional aspect, the DCI format that includes bit 601 may be identified to base station 105 in a fixed allocation, where extra bit, bit 601, is added only to a particular format (e.g., uplink format 0_1 or downlink format 1_1). Alternatively, the placement of bit 601 can be determined based on RRC configuration information (e.g., RRC configuration can indicate which DCI format is used for DFI presence indication). The additional bit, bit 601, may also be placed in a specific search space by base station 105. This search space may also be indicated in a fixed allocation. For example, if DFI DCI 600 is an uplink format 0_1, bit 601 may be placed in a UE-specific search space for UE 115 (format 0_1 is not generally used for common search space). Alternatively, bit 601 can be placed in either a type 3 PDCCH common search space set or a UE-specific search space for UE 115. Base station 105 may further configure UE 115 to indicate the search space used for placement of bit 601 (e.g. within the search space configuration).

In an additional aspect of the illustrated example, bit 601 can be added for CS-RNTI-based DCIs. When UE 115 receives DFI DCI 600 scrambled with CS-RNTI, UE 115 may assume that bit 601 for indicating DFI presence will be available. However, if DFI DCI 600 is scrambled with C-RNTI, UE 115 may assume that no bit is included for indicating DFI presence. It should be noted that where DFI DCI 600 is CS-RNTI-based, base station 105 can additionally configure whether bit 601 for indicating DFI presence within DCI via RRC signaling or a medium access control (MAC) control element (MAC CE).

Figure 7:
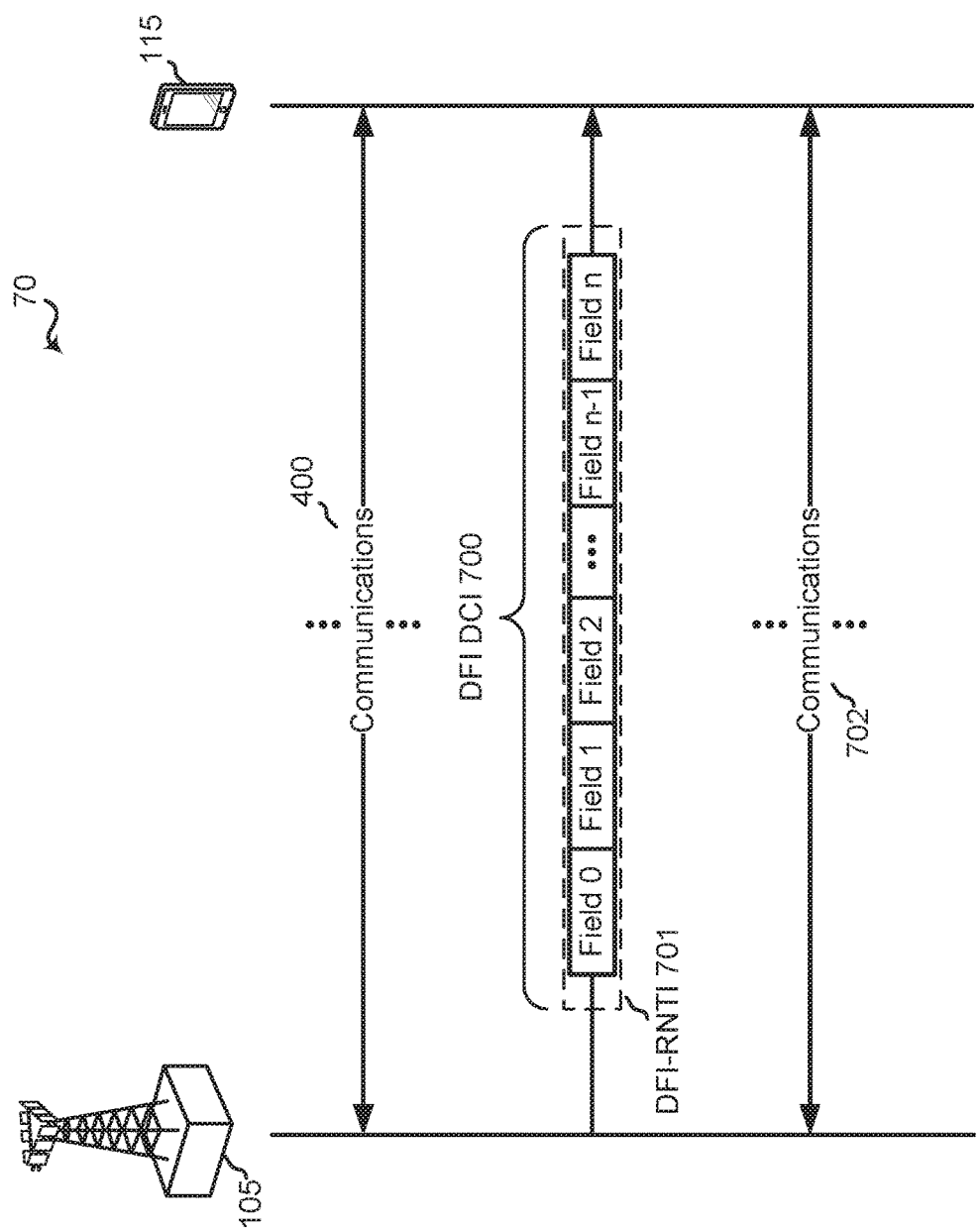
FIG. 7 is a call-flow diagram illustrating a portion of a NR-U network having a base station and UE configured according to one aspect of the present disclosure.

FIG. 7 is a call-flow diagram illustrating a portion of NR-U network 70 having base station 105 and UE 115 configured according to one aspect of the present disclosure. Similar to environment described in FIG. 6, base station 105 and UE 115 conduct communications 400, in which base station 105 may transmit messages and signaling to UE 115 and UE 115 may transmit messages and signaling to base station 105. In response to some signaling from UE 115 within communications 400, base station 105 may generate DFI reflecting ACK/NACK information for CG or non-CG related HARQ processes, as the case may be. Base station 105 includes the DFI within DFI DCI 700. UE 115, upon receipt of DFI DCI 700, may obtain the ACK/NACK information from the DFI and configure relevant uplink transmissions of communications 702 further between UE 115 and base station 105.

According to the illustrated aspect, base station 105 uses a newly-defined RNTI (e.g., DFI-RNTI) to indicate DFI presence. The new RNTI can be configured as UE-specific. Therefore, when UE 115 receives DFI DCI 700 that has been scrambled using the new RNTI, DFI-RNTI 701, UE 115 may assume that the DFI is present in DFI DCI 700. The illustrated aspect which uses the newly-defined RNTI can be used when CS-RNTI is not available, such as, when CG resources have not been configured. For example, base station 105 can use CS-RNTI to scramble DFI DCI 700 when CG resources are configured, while it can use DFI-RNTI 701 when CG resources are not configured.

Figure 8:
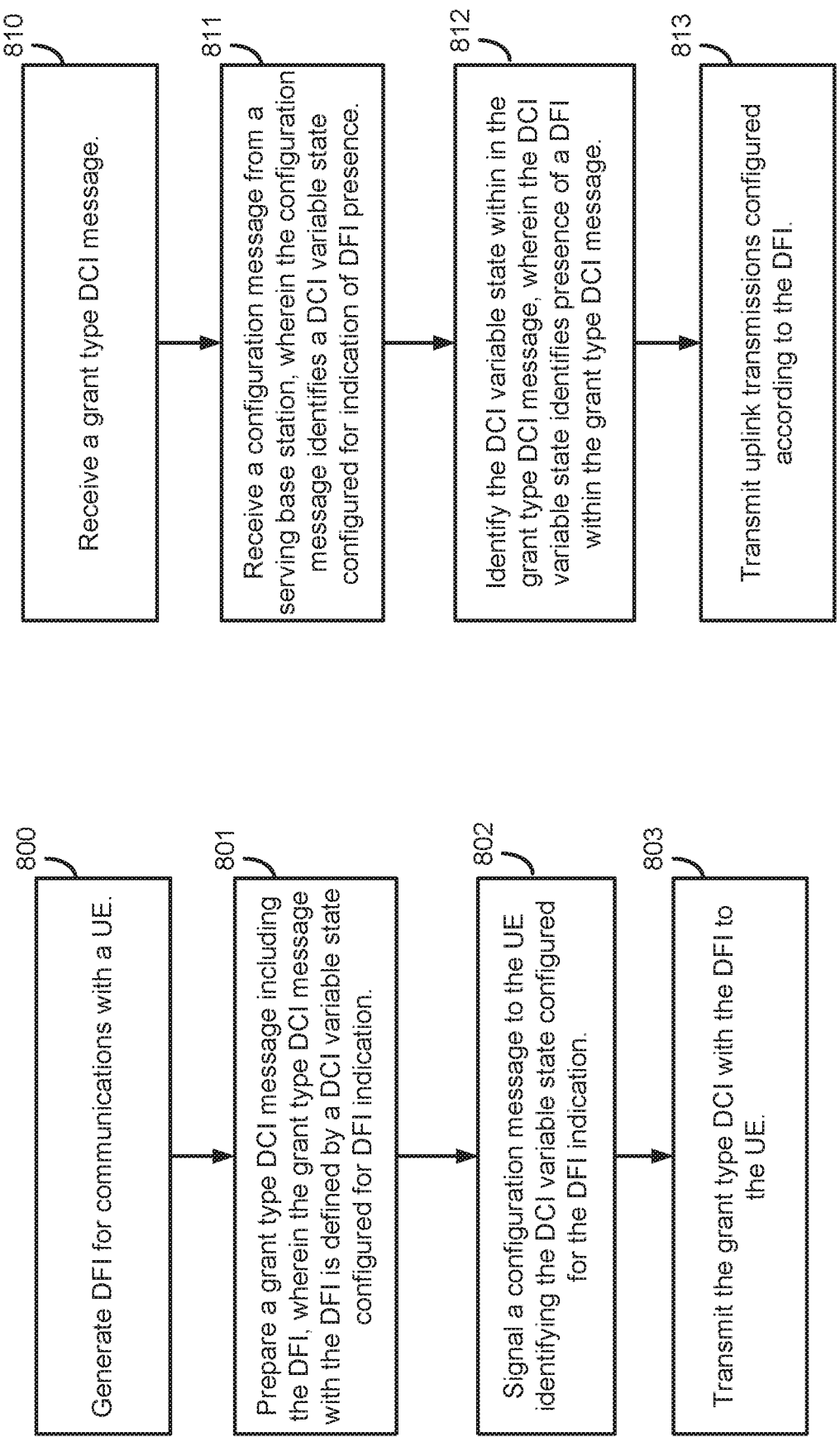
FIGS. 8A and 8B are block diagrams illustrating example blocks executed to implement aspects of the present disclosure.

FIG. 8A is a block diagram illustrating example aspects executed to implement one aspect of the present disclosure. The example blocks will also be described with respect to base station 105 as illustrated in FIG. 11.

At block 800, a base station generates DFI for communications with a UE. A base station, such as base station 105, may receive uplink transmissions from a UE, via antennas 234a-t and wireless radios 1100a-t, and determine the ACK/NACK status for such transmissions. Under control of controller/processor 240, base station 105 executes DFI logic 1101, stored in memory 242. The execution environment of DFI logic 1101 provides base station 105 the functionality for handling DFI operations. Within the execution environment of DFI logic 1101, base station 105 assembles the DFI message for the UE using the ACK/NACK status.

At block 801, the base station prepares a grant type DCI message including the DFI, wherein the grant type DCI message with the DFI is defined by a DCI variable state configured for DFI indication. Within the execution environment of DFI logic 1101, base station 105 uses a DCI message to carry the DFI. Base station 105 elects to include the DFI in a grant type DCI, according to a DCI format available for uplink or downlink grants. In preparing the grant type DCI, base station 105, under control of controller/processor 240, may execute DCI alignment logic 1103. The execution environment of DCI alignment logic may ensure that the final DCI size of the grant type DCI with the DFI payload does not exceed the expected DCI size of the grant type DCI. Alignment may include adding zero padding when the DFI payload is small creating a DCI size smaller than the expected grant type DCI size. In alternative scenarios where the DFI payload size causes the DCI size of the grant type DCI to exceed the expected DCI size of the grant type DCI, alignment may include truncation of bits from the DCI or the DFI payload.

At block 802, the base station signals a configuration message to the UE identifying the DCI variable state configured for the DFI indication. In order to signal the UE that the grant type DCI includes the DFI, base station 105 may signal a configuration message that reveals which DCI variable state will indicate the presence of the DFI in the grant type DCI. Under control of controller/processor 240, base station 105 executes DFI presence signaling logic 1102. The execution environment of DFI presence signaling logic 1102 provide the functionality to base station 105 for communicating the configuration message that will allow the UE to know that the DFI is present in the grant type DCI. Base station transmits the configuration message via wireless radios 1100*a-t* and antennas 234*a-t*.

At block 803, the base station transmits the grant type DCI with the DFI to the UE. Once base station 105 has generated the grant type DCI message that includes the DFI payload and the DCI variable state identifying the presence of the DFI, it may transmit the grant type DCI to the UE via wireless radios 1100*a-t* and antennas 234*a-t*.

FIG. 8B is a block diagram illustrating example aspects executed to implement one aspect of the present disclosure. The example blocks will also be described with respect to UE 115 as illustrated in FIG. 12.

At block 810, a UE receives a grant type DCI message. A UE, such as UE 115, receives the grant type DCI message via antennas 252*a-r* and wireless radios 1200*a-r*. UE 115 may decode the signals received to reveal the grant type DCI message.

At block 811, the UE receives a configuration message from a serving base station, wherein the configuration message identifies a DCI variable state configured for indication of DFI presence. Under control of controller/processor 280, UE 115 executes DFI logic 1201 and DFI presence signaling logic 1202, stored in memory 282. The execution environment of DFI logic 1201 and DFI presence signaling logic 1202 provides UE 115 the functionality to conduct operations using the DFI. UE 115 knows that it will receive a configuration message that identifies the DCI variable state that will indicate the presence of a DFI within the grant type DCI.

At block 812, the UE identifies the DCI variable state within in the grant type DCI message, wherein the DCI variable state identifies presence of a DFI within the grant type DCI message. Within the execution environment of DFI logic 1201, UE 115 uses the instructions from the configuration message to look for the DCI variable state within the grant type DCI that indicates that the grant type DCI includes a DFI related to prior uplink transmissions (CG transmissions or otherwise) transmitted by UE 115.

At block 813, the UE transmits uplink transmissions configured according to the DFI. After identifying the DFI, UE 115 may use the ACK/NACK information to configure or adjust future uplink transmissions. As such, UE 115 uses the identified DFI and adjusts the uplink transmissions transmitted via wireless radios 1200*a-r* and antennas 252*a-r*.

Figure 9:
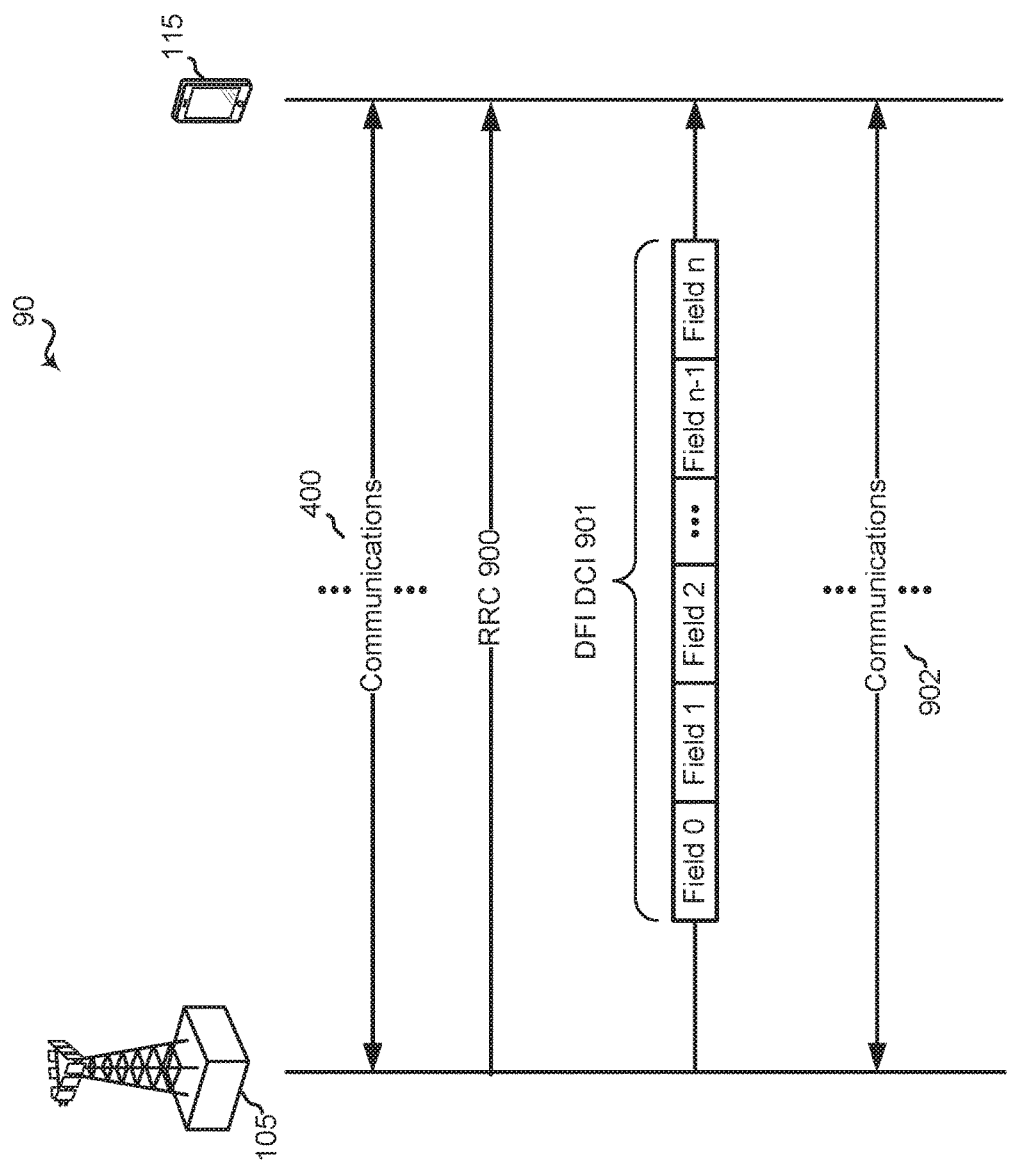
FIG. 9 is a call-flow diagram illustrating a portion of a NR-U network having a base station and UE configured according to one aspect of the present disclosure.

FIG. 9 is a call-flow diagram illustrating a portion of NR-U network 90 having base station 105 and UE 115 configured according to one aspect of the present disclosure. Base station 105 and UE 115 conduct communications 400, in which base station 105 may transmit messages and signaling to UE 115 and UE 115 may transmit messages and signaling to base station 105. In response to some signaling from UE 115 within communications 400, base station 105 may generate DFI reflecting ACK/NACK information for CG or non-CG related HARQ processes, as the case may be. Base station 105 includes the DFI within DFI DCI 901. UE 115, upon receipt of DFI DCI 901, may obtain the ACK/NACK information from the DFI and configure relevant uplink transmissions of communications 902 further between UE 115 and base station 105.

According to the illustrated aspect, base station 105 sends RRC signaling 900 to UE 115 to configure UE 115 to recognize which DCI variable state can be used for DFI indication. For example, RRC signaling 900 can indicate that a CS-RNTI-based DCI with DCI format 0_0 and a HARQ ID=1, can be used for indicating DFI presence. Thus, upon receipt of DFI DCI 901, UE 115 may recognize that DFI DCI 901 is scrambled using CS-RNTI in a DCI format 0_0 and a HARQ ID=1. With this recognition of the DCI variable state configured for indication of DFI presence, UE 115 assumes that the DFI is present in DFI DCI 901. It should be noted that the illustrated aspect takes advantage of the fact that some DCI variable states are not usable depending on the configuration of the number of carriers or BWPs or other physical layer parameters of UE 115. Base station 105 may select one of such unusable states for the DCI variable state and signal UE 115 that this DCI variable state will be used for indicating DFI presence.

The payload of the DFI can contain a large number of bits (e.g., ACK/NACK bits for all HARQ IDs, CBG-based feedback for a set of HARQ IDs, NDI value for CG HARQ processes, etc.). With the given number of DCI fields, it is possible that payload size of the DFI can exceed the payload size of a grant-carrying DCI of the same DCI format. In one example, a given grant type DCI that includes a DFI and an indication of its presence is configured as the same DCI type as a grant type DCI used to schedule and grant (the grant and associated DCI type may be for uplink or downlink grants). In order to reduce or simply maintain the blind decoding effort of a UE, the DCI size of a grant type DCI with the DFI may be aligned with the DCI size of a grant type DCI with a grant. The process of alignment can be implemented using truncation or padding of payload of either the DFI or the grant.

Figure 10A:
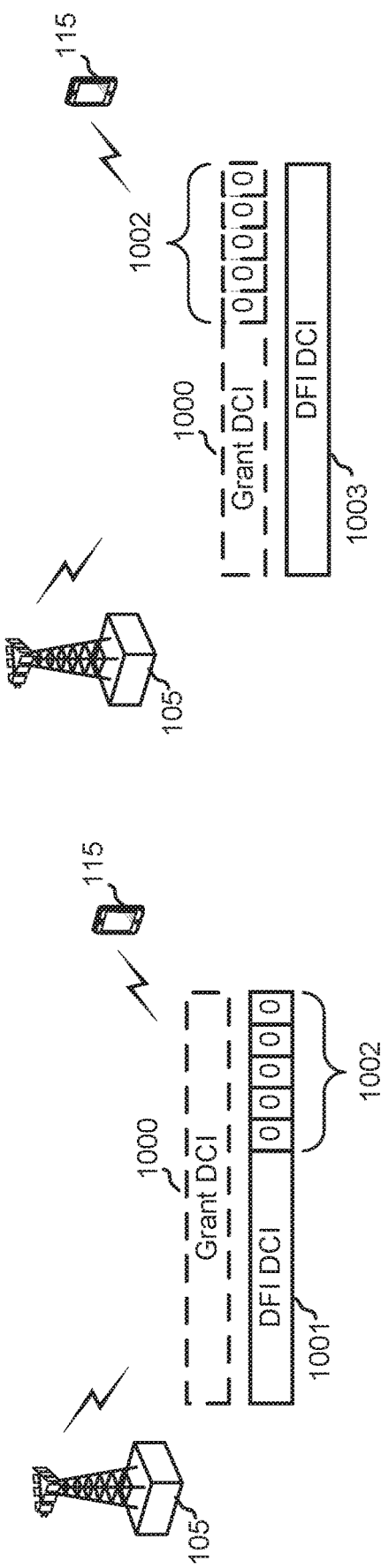
FIGS. 10A-10C are block diagrams illustrating a base station and UE configured according to aspects of the present disclosure.
Figure 10B:
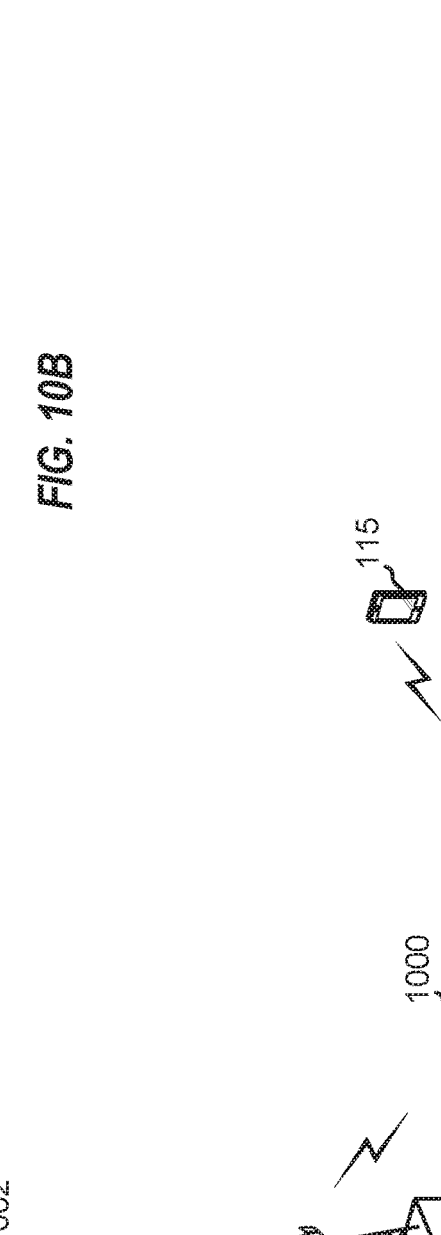
Figure 10C:
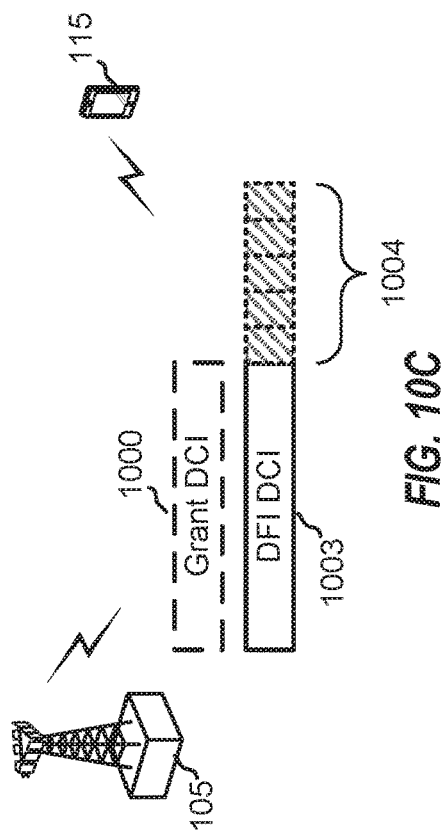

FIGS. 10A-10C are block diagrams illustrating a base station 105 and UE 115 configured according to aspects of the present disclosure. In considering alignment of the DCI sizes, it may be preferable not truncate the DCI payload carrying the grant. As illustrated in FIG. 10A, the DCI size of DFI DCI 1001 is smaller than the DCI size for grant DCI 1000, even though both DFI DCI 1001 and grant DCI 1000 are configured with the same DCI format. According to the illustrated example aspect, base station 105 may align the DCI size by adding zero-padding 1002 to the DFI of DFI DCI 1001. Zero-padding 1002 to added to make the total new size of extended DFI DCI 1001 the same as grant DCI 1000.

As illustrated in FIG. 10B, the DCI size of DFI DCI 1003 is larger than the DCI size of grant DCI 1000. In such a scenario, the example aspect provides for zero-padding 1002 to be added to grant DCI 1000 to create a DCI size equal to the DCI size of DFI DCI 1003. Alternatively, as illustrated in FIG. 10C, where the DCI size of DFI DCI 1003 is larger than the DCI size of grant DCI 1000, bits are truncated from DFI DCI 1003, truncation bits 1004, to make the result truncated DCI size of DFI DCI 1003 the same as the DCI size of grant DCI 1000. Truncating the bits from DFI DCI 1003, as illustrated in FIG. 10C, may be more optimal as it reduces or maintains the number of different DCI sizes that UE 115 would be monitoring.

When implementing truncation of DFI DCI 1003, various methods may be employed to determine which bits should be included in truncation bits 1004. The standards in NR Rel-15 would allow for base station 105 to truncate the frequency allocation field of any uplink grants in such cases. However, a DFI may not always contain a frequency allocation field. According to one example aspect, a truncation order of DFI fields can be defined from the lowest priority to the highest priority, such that the lower priority DFI fields are added first to truncation bits 1004 before moving to the next higher priority DFI field. Lower priority bits may be bits, such as ACK/NACK feedback bits associated with non-CG HARQ processes, CBG-based feedback, and NDI bit fields, while higher priority bits can be bits, such as ACK/NACK feedback bits associated with CG HARQ processes. Different implementations of the presently described example aspect may provide for different priority hierarchies. For example, one priority hierarchy may be: ACK/NACK bits for CG HARQ process >ACK/NACK bits for non-CG HARQ process >CBG based feedback >NDI bits; while a second priority hierarchy may be: ACK/NACK bits for CG HARQ process >CBG based feedback >ACK/NACK bits for non-CG HARQ process >NDI bits. It should be noted that the fields for truncated bits 1004 should be placed in the same position for DCI containing a grant and DCI containing DFI, otherwise, it may create confusion at UE 115 for DCI decoding.

In an optional aspect as illustrated in FIG. 10C, truncated bits 1004 may be placed corresponding to the frequency allocation field in a normal grant type DCI. For example, if bits 4-10 in grant DCI 1000 containing a grant are allocated for frequency allocation, then truncation bits 1004, on DFI DCI 1003 should also be placed on bits 4-10. The truncated bits 1004 in DFI DCI 1003 may either contain dummy bits or may contain lower priority DFI payload.

Another optional aspect of the present disclosure is for base station 105 to ensure that DFI payload does not increase the size limit of a grant type DCI. NDI bits are useful to include to enable DFI retransmission and avoid confusion between base station 105 and UE 115 about the transport block for which retransmission is signaled. However, their presence is not mandatory. For example, base station 105 can chose to include them when the DFI payload size is small. In a first optional implementation, base station 105 may include NDI bits for all of the HARQ IDs. Otherwise, in a second optional implementation, base station may include NDI for a subset of HARQ IDs. It should be noted that determining the NDIs for inclusion in the DFI payload may be RRC configured or may be determined implicitly by base station 105 (e.g., the number of HARQ IDs such that it leads to no increase in DCI size). Additional optional implementations can be defined for ACK/NACK bits of non-CG HARQ processes and CBG feedback bits.

As indicated previously, DFI has been defined in the context of CG resources, but it may also contain information related to ACK/NACK status of non-CG HARQ processes. This type of DFI may be used for contention window updates and, thus, may be useful independent of CG configuration. While the example above have been described without respect to whether or not CG operations are configured and/or activated, the previously described aspects of the present disclosure may be applied to scenarios where CG operations are configured or not. In a first example aspect, the DFI can be transmitted associated with CG operations. For example, a DFI can be sent if CG resources are configured. For the type of CG operation where the CG resources are dynamically activated or deactivated using DCI messaging, DFI can either be sent as long as the CG operations are configured, independent of activation/deactivation, or be sent when the CG operations are both configured and activated, such that UE 115 is in activated state for configured grant transmissions.

In an alternative aspect, if CS-RNTI is used for DFI signaling, then base station 105 can configure a CS-RNTI value for UE 115 without configuring CG resources. Thus, DFI may be sent and identified even without CG operations. In a further alternative aspect, base station 105 can use a different RNTI (e.g., DFI RNTI) to indicate DFI presence when CG configuration is not available, but use CS-RNTI when CG configuration is available. Similarly, when CG configuration is not available, base station 105 can use C-RNTI to indicate DFI presence. Again, when CG configuration is available, then base station 105 can transmit DFI using CS-RNTI-based DCI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3A, 3B, 5A, 5B, 8A, and 8B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various aspects of the present disclosure may be implemented in many different ways, including methods, processes, non-transitory computer-readable medium having program code recorded thereon, apparatus having one or more processors with configurations and instructions for performing the described features and functionality, and the like. A first example aspect of the present disclosure configured for wireless communication may include generating, by a base station, DFI for communications with a UE; preparing, by the base station, a grant type DCI message including the DFI; adding, by the base station, a DFI indicator to the grant type DCI message; and transmitting, by the base station, the grant type DCI with the DFI to the UE.

A second aspect, based on the first aspect, wherein the DFI indicator includes one of: a DFI bit added to the grant type DCI message; or a DFI-RNTI by which the grant type DCI message with the DFI is scrambled.

A third aspect, based on the second aspect, wherein the DFI bit differentiates a payload of the grant type DCI message as one of: a transmission grant or the DFI.

A fourth aspect, based on the third aspect, wherein the DFI bit is added to the grant type DCI message when a CS-RNTI is used for scrambling the grant type DCI message with the DFI.

A fifth aspect, based on the third aspect, further including: identifying, by the base station, the DFI bit based on a DCI format of the grant type DCI message, wherein the DFI bit is associated with the DCI format according to one of: a fixed allocation of DFI bits to DCI formats or RRC configuration.

A sixth aspect, based on the third aspect, wherein the DFI bit is added to the grant type DCI message in an identified search space, wherein the identified search space is one of: fixed or configured by the base station.

A seventh aspect, based on the third aspect, further including: determining, by the base station, a DCI size of the grant type DCI message with the DFI; determining, by the base station, the DCI size is smaller than a size of a DCI message with a grant; adding, by the base station, zero padding to payload of the DFI for the grant type DCI message to equal the size.

An eighth aspect, based on the first aspect, further including: determining, by the base station, a DCI size of the grant type DCI message with the DFI; in response to the DCI size being larger than a size of a DCI message with a grant, one of: adding, by the base station, zero padding to the DCI message with the grant to equal the DCI size; or truncating, by the base station, the grant type DCI message with the DFI to equal the size.

A ninth aspect, based on the eighth aspect, wherein the truncating includes: identifying a priority relationship between each field of a plurality of fields designated for the grant type DCI with the DFI; and truncating lower priority fields of the plurality of fields until the grant type DCI message with the DFI is equal to the size.

A tenth aspect, based on the first aspect, wherein the generating the DFI includes:
projecting a DCI size of the grant type DCI with the DFI; and including NDI bits in the DFI when the DCI size projected does not exceed a size of a DCI message with a grant.

An eleventh aspect, based on the tenth aspect, wherein the including the NDI bits includes one of: including the NDI bits for each HARQ ID associated with the communications between the base station and the UE; or including the NDI bits for a subset of HARQ IDs of the each HARQ ID associated with the communication between the base station and the UE.

A twelfth aspect, based on the eleventh aspect, wherein the including the NDI bits is one of: RRC configured; or determined implicitly by the base station.

A thirteenth aspect, based on the first aspect, further including: configuring, by the base station, CG resources for CG transmissions by the UE.

A fourteenth aspect, based on the thirteenth aspect, further including: signaling, by the base station, an activation message activating CG operations.

A fifteenth aspect, based on the first aspect, further including: identifying, by the base station, that CG operations are not configured; generating, by the base station, a UE-specific RNTI associated with the UE, wherein the indicating includes indicating the presence of the DFI using the available DCI variable state and the UE-specific RNTI.

A sixteenth aspect, based on the first aspect, further including: identifying, by the base station, that CG operations are not configured, wherein the indicating includes indicating the presence of the DFI using the available DCI variable state and C-RNTI.

A seventeenth aspect configured for wireless communication may include receiving, at a UE, a grant type DCI message; identifying, by the UE, a DFI indicator within in the grant type DCI message, wherein the DFI indicator identifies presence of a DFI within the grant type DCI message; and transmitting, by the UE, uplink transmissions configured according to the DFI.

An eighteenth aspect, based on the seventeenth aspect, wherein the DFI indicator includes one of: a DFI bit added to the grant type DCI message; or a DFI-RNTI by which the grant type DCI message with the DFI is scrambled.

A nineteenth aspect, based on the eighteenth aspect, wherein the DFI bit differentiates a payload of the grant type DCI message as one of: a transmission grant or the DFI, and wherein the grant type DCI message with the DFI bit is scrambled by a CS-RNTI.

A twentieth aspect configured for wireless communication, includes an apparatus comprising: at least one processor; and a memory coupled to the at least one processor, wherein the at least one processor is configured to generate, by a base station, DFI for communications with a UE; to prepare, by the base station, a grant type DCI message including the DFI; to add, by the base station, a DFI indicator to the grant type DCI message; and to transmit, by the base station, the grant type DCI with the DFI to the UE.

A twenty-first aspect, based on the twentieth aspect, wherein the DFI indicator includes one of: a DFI bit added to the grant type DCI message; or a DFI-RNTI by which the grant type DCI message with the DFI is scrambled.

A twenty-second aspect, based on the twenty-first aspect, further including configuration of the at least one processor to identify, by the base station, the DFI bit based on a DCI format of the grant type DCI message, wherein the DFI bit is associated with the DCI format according to one of: a fixed allocation of DFI bits to DCI formats or RRC configuration, and wherein the DFI bit is added to the grant type DCI message when a CS-RNTI is used for scrambling the grant type DCI message with the DFI.

A twenty-third aspect, based on the twentieth aspect, further including configuration of the at least one processor: to determine, by the base station, a DCI size of the grant type DCI message with the DFI; to determine, by the base station, the DCI size is smaller than a size of a DCI message with a grant; to add, by the base station, zero padding to payload of the DFI for the grant type DCI message to equal the size.

A twenty-fourth aspect, based on the twentieth aspect, further including configuration of the at least one processor: to determine, by the base station, a DCI size of the grant type DCI message with the DFI; in response to the DCI size being larger than a size of a DCI message with a grant, to one of:

add, by the base station, zero padding to the DCI message with the grant to equal the DCI size; or truncate, by the base station, the grant type DCI message with the DFI to equal the size.

A twenty-fifth aspect, based on the twentieth aspect, wherein the configuration of the at least one processor to generate the DFI includes configuration of the at least one processor: to project a DCI size of the grant type DCI with the DFI; and to include NDI bits in the DFI when the DCI size projected does not exceed a size of a DCI message with a grant.

A twenty-sixth aspect, based on the twentieth aspect, further including configuration of the at least one processor to configure, by the base station, CG resources for CG transmissions by the UE.

A twenty-seventh aspect, based on the twentieth aspect, further including configuration of the at least one processor: to identify, by the base station, that CG operations are not configured; to generate, by the base station, a UE-specific RNTI associated with the UE, wherein the configuration of the at least one processor to indicate includes configuration of the at least one processor to indicate the presence of the DFI using the available DCI variable state and the UE-specific RNTI.

A twenty-eighth aspect, based on the twentieth aspect, further including configuration of the at least one processor to identify, by the base station, that CG operations are not configured, wherein the configuration of the at least one processor to indicate includes configuration of the at least one processor to indicate the presence of the DFI using the available DCI variable state and C-RNTI.

A twenty-ninth aspect of the present disclosure configured for wireless communication, includes an apparatus that includes at least one processor; and a memory coupled to the at least one processor, wherein the at least one processor is configured: to receive, at a UE, a grant type DCI message; to identify, by the UE, a DFI indicator within in the grant type DCI message, wherein the DFI indicator identifies presence of a DFI within the grant type DCI message; and to transmit, by the UE, uplink transmissions configured according to the DFI.

A thirtieth aspect, based on the twenty-ninth aspect, wherein the DFI indicator includes one of: a DFI bit added to the grant type DCI message; or a DFI-RNTI by which the grant type DCI message with the DFI is scrambled.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
generating, by a network entity, downlink feedback information (DFI) for communications with a user equipment (UE);
preparing, by the network entity, a grant type downlink control information (DCI) message that includes the DFI, wherein the grant type DCI message further includes a DFI indicator to indicate a presence of the DFI within the grant type DCI message, the DFI indicator including a DFI bit added to the grant type DCI message, that is a single DFI bit, and that differentiates the grant type DCI message as one of an activation/deactivation of configured grant (CG) transmission or the DFI;
aligning a DCI size of the grant type DCI message that includes the DFI with an expected grant type DCI size;
identifying, by the network entity, the DFI bit based on a DCI format of the grant type DCI message, wherein the DFI bit is associated with the DCI format containing one of: a fixed allocation of DFI bits to DCI formats or a transmission grant; and transmitting, by the network entity, the grant type DCI message with the DFI to the UE.

2. The method of claim 1, wherein aligning the DCI size of the grant type DCI message that includes the DFI includes:

adding padding bits to the grant type DCI message in response to the size of the DCI message that includes the DFI being less than the expected grant type DCI size; or truncating bits of the grant type DCI message in response to the size of the DCI message that includes the DFI being greater than the expected grant type DCI size.

3. The method of claim 1, further comprising scrambling the grant type DCI message using a configured scheduling-radio network temporary identifier (CS-RNTI).

4. The method of claim 1, wherein the DFI bit is added to the grant type DCI message in an identified search space, wherein the identified search space is one of fixed or configured by the network entity.

5. The method of claim 1, further including:

determining, by the network entity, the DCI size of the grant type DCI message that includes the DFI;

determining, by the network entity, that the DCI size is smaller than a size of a DCI message with a grant; and adding, by the network entity, zero padding to the DFI for the grant type DCI message to equal the DCI size in response to determining that the DCI size is smaller than the size of the DCI message with the grant.

6. The method of claim 1, further including:

determining, by the network entity, the DCI size of the grant type DCI message that includes the DFI;

in response to the DCI size being larger than a size of a DCI message with a grant, truncating, by the network entity, the grant type DCI message with the DFI to equal the size.

7. The method of claim 6, wherein the truncating includes:

identifying a priority relationship between each field of a plurality of fields designated for the grant type DCI with the DFI; and truncating lower priority fields of the plurality of fields until the grant type DCI message with the DFI is equal to the size.

8. The method of claim 1, wherein the generating the DFI includes:

projecting the DCI size of the grant type DCI with the DFI; and in response to determining that a projected DCI size does not exceed a size of a DCI message with a grant, including new data indicator (NDI) bits in the DFI.

9. The method of claim 8, wherein the including the NDI bits includes one of:

including the NDI bits for each hybrid automatic repeat request (HARQ) identifier (HARQ ID) associated with the communications between the network entity and the UE; or including the NDI bits for a subset of HARQ IDs of the each HARQ ID associated with the communication between the network entity and the UE.

10. The method of claim 9, wherein the including the NDI bits is one of:

radio resource control (RRC) configured; or determined implicitly by the network entity.

11. The method of claim 1, further including:

configuring, by the network entity, CG resources for CG transmissions by the UE.

12. The method of claim 11, further including:

signaling, by the network entity, an activation message activating CG operations.

13. The method of claim 1, further including:

identifying, by the network entity, that CG operations are not configured;

indicating, by the network entity, a presence of the DFI using an available DCI variable state.

14. The method of claim 1, further including:

identifying, by the network entity, that CG operations are not configured, wherein the indicating includes indicating a presence of the DFI using an available DCI variable state and cell-radio network temporary identifier (C-RNTI).

15. A method of wireless communication, comprising:

receiving, at a user equipment (UE), a grant type downlink control information (DCI) message, wherein:

the grant type DCI message includes a downlink feedback information (DFI) indicator that indicates a presence of a DFI within the grant type DCI message, the DFI indicator including a DFI bit added to the grant type DCI message, that is a single DFI bit, and that differentiates the grant type DCI message as one of an activation/deactivation of configured grant (CG) transmission or the DFI, and a DCI size of the grant type DCI message that includes the DFI is aligned with an expected grant type DCI size;

obtaining, by the UE, an identification of the DFI bit based on a DCI format of the grant type DCI message, wherein the DFI bit is associated with the DCI format containing one of: a fixed allocation of DFI bits to DCI formats or a transmission grant; and transmitting, by the UE, an uplink transmission based at least in part on the DFI.

16. The method of claim 15, wherein the grant type DCI message that includes the DFI bit is scrambled by a configured scheduling-radio network temporary identifier (CS-RNTI).

17. An apparatus configured for wireless communication, the apparatus comprising:

at least one processor; and at least one memory coupled to the at least one processor, wherein the at least one processor is configured to:

generate downlink feedback information (DFI) for communications with a user equipment (UE);

prepare a grant type downlink control information (DCI) message that includes the DFI, wherein the grant type DCI message further includes a DFI indicator to indicate a presence of the DFI within the grant type DCI message, the DFI indicator including a DFI bit added to the grant type DCI message, that is a single DFI bit, and that differentiates the grant type DCI message as one of an activation/deactivation of configured grant (CG) transmission or the DFI;

align a DCI size of the grant type DCI message that includes the DFI with an expected grant type DCI size;

identify the DFI bit based on a DCI format of the grant type DCI message, wherein the DFI bit is associated with the DCI format containing one of: a fixed allocation of DFI bits to DCI formats or a transmission grant; and transmit the grant type DCI message with the DFI to the UE.

18. The apparatus of claim 17, further including configuration of the at least one processor to scramble the grant type DCI message using a configured scheduling-radio network temporary identifier (CS-RNTI).

19. The apparatus of claim 17, further including configuration of the at least one processor to:
- determine the DCI size of the grant type DCI message that includes the DFI;
- determine that the DCI size is smaller than a size of a DCI message with a grant; and
- add zero padding to the DFI for the grant type DCI message to equal the DCI size.

20. The apparatus of claim 17, further including configuration of the at least one processor to:
- determine the DCI size of the grant type DCI message that includes the DFI;
- in response to the DCI size being larger than a size of a DCI message with a grant, truncate the grant type DCI message with the DFI to equal the size.

21. The apparatus of claim 17, wherein the configuration of the at least one processor to generate the DFI includes configuration of the at least one processor to:
- project the DCI size of the grant type DCI with the DFI; and
- in response to a determination that a projected DCI size does not exceed a size of a DCI message with a grant, include new data indicator (NDI) bits in the DFI.

22. The apparatus of claim 17, further including configuration of the at least one processor to configure CG resources for CG transmissions by the UE.

23. The apparatus of claim 17, further including configuration of the at least one processor to:
- identify that CG operations are not configured, wherein the configuration of the at least one processor to indicate includes configuration of the at least one processor to indicate a presence of the DFI using an available DCI variable state.

24. The apparatus of claim 17, further including configuration of the at least one processor to identify that CG operations are not configured, wherein the configuration of the at least one processor to indicate includes configuration of the at least one processor to indicate a presence of the DFI using an available DCI variable state and cell-radio network temporary identifier (C-RNTI).

25. An apparatus configured for wireless communication, the apparatus comprising:
- at least one processor; and
- at least one memory coupled to the at least one processor, wherein the at least one processor is configured to:
  - receive a grant type downlink control information (DCI) message, wherein:
    - the grant type DCI message includes a downlink feedback information (DFI) indicator that indicates a presence of a DFI within the grant type DCI message, the DFI indicator including a DFI bit added to the grant type DCI message, that is a single DFI bit, and that differentiates the grant type DCI message as one of an sctivation/deactivation grant (CG) transmission or the DFI, and
    - a DCI size of the grant type DCI message that includes the DFI is aligned with an expected grant type DCI size;
  - obtain an identification of the DFI bit based on a DCI format of the grant type DCI message, wherein the DFI bit is associated with the DCI format containing one of:
- a fixed allocation of DFI bits to DCI formats or a transmission grant; and
  - transmit an uplink transmission based at least in part on the DFI.

26. The apparatus of claim 25, wherein the grant type DCI message that includes the DFI bit is scrambled by a configured scheduling-radio network temporary identifier (CS-RNTI).

* * * * *